United States Patent
Gohara et al.

(10) Patent No.: US 11,131,872 B2
(45) Date of Patent: Sep. 28, 2021

(54) MIRROR DISPLAY APPARATUS

(71) Applicant: MURAKAMI CORPORATION, Shizuoka (JP)

(72) Inventors: Yoshihiro Gohara, Kanazawa (JP); Noriyuki Unno, Shizuoka (JP); Mina Sugino, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 17/135,175

(22) Filed: Dec. 28, 2020

(65) Prior Publication Data
US 2021/0215961 A1 Jul. 15, 2021

(30) Foreign Application Priority Data

Jan. 9, 2020 (JP) .............................. JP2020-001986

(51) Int. Cl.
| G02F 1/133 | (2006.01) |
| G02F 1/1335 | (2006.01) |
| G02F 1/137 | (2006.01) |

(52) U.S. Cl.
CPC .......... *G02F 1/13306* (2013.01); *G02F 1/137* (2013.01); *G02F 1/133536* (2013.01)

(58) Field of Classification Search
CPC ................................................. G02F 1/13306
See application file for complete search history.

(56) References Cited

U.S. PATENT DOCUMENTS

| 7,495,719 B2 | 2/2009 | Adachi et al. |
| 7,633,567 B2 | 12/2009 | Yamada et al. |
| 2004/0051820 A1* | 3/2004 | Yuan ........................ G02F 1/31 349/33 |
| 2004/0100598 A1 | 5/2004 | Adachi et al. |
| 2009/0002575 A1* | 1/2009 | Yamada .................... B60R 1/04 349/1 |
| 2016/0253974 A1* | 9/2016 | Fellinger .................. G09G 3/04 345/208 |
| 2019/0263322 A1 | 8/2019 | Hayashi et al. |
| 2020/0018998 A1 | 1/2020 | Gohara |

FOREIGN PATENT DOCUMENTS

| JP | 2000-267629 | 9/2000 |
| JP | 2004-317908 | 11/2004 |
| JP | 2009-008881 | 1/2009 |
| JP | 4348061 | 10/2009 |
| WO | 2018/061676 | 4/2018 |

* cited by examiner

*Primary Examiner* — Edmond C Lau
(74) *Attorney, Agent, or Firm* — Greenblum & Bernstein, P.L.C.

(57) ABSTRACT

A mirror display apparatus that subjects a mirror optical element to pulse voltage driving so that a reflectivity in a mirror mode can be changed by means of a duty cycle of the pulse voltage is provided. A mirror display apparatus includes a monitor display device and a mirror optical element disposed on the front side of the monitor display device. The mirror optical element includes a liquid-crystal panel with a reflection-type polarizer disposed on the back side thereof. The mirror optical element has a reflectivity and a transmissivity that are changed in respective directions opposite to each other via electric driving using a voltage applied to the liquid-crystal panel. A control circuit drives the liquid-crystal panel using a pulse voltage and performs control to change the reflectivity and the transmissivity of the mirror optical element by changing a duty cycle of the pulse voltage.

8 Claims, 9 Drawing Sheets

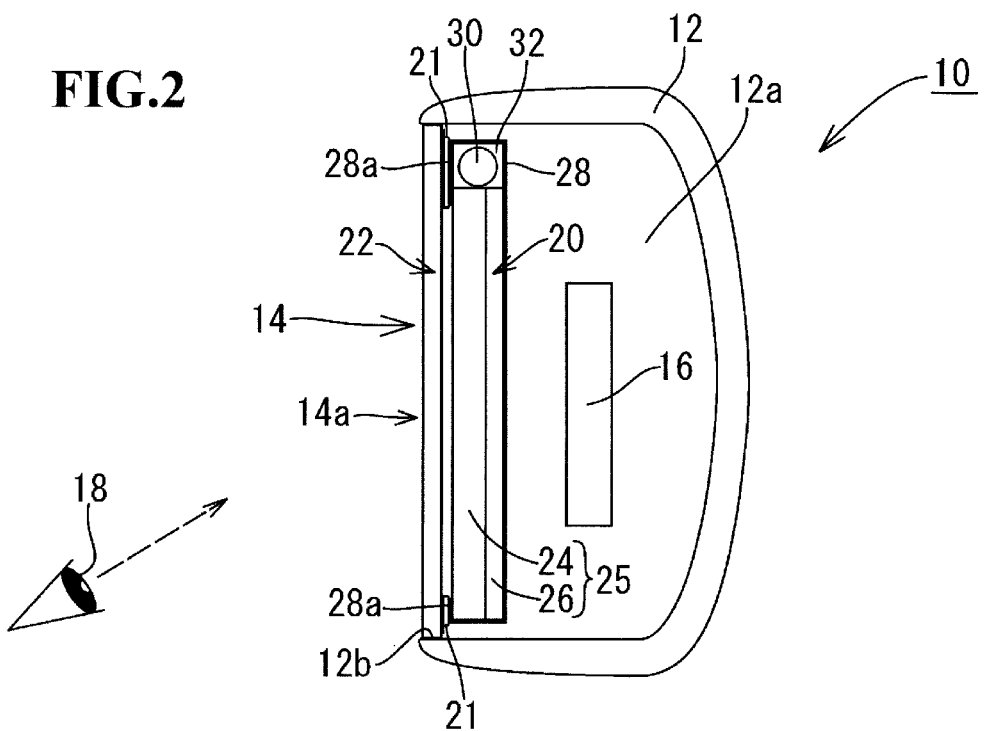
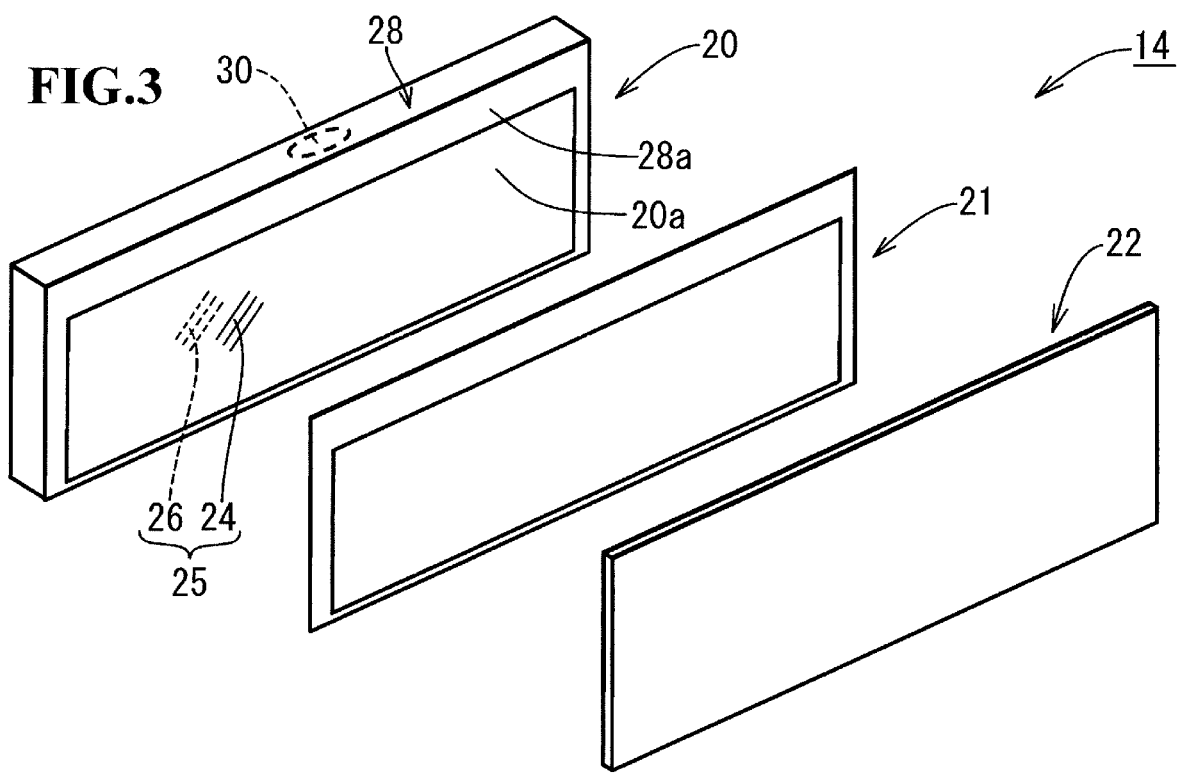

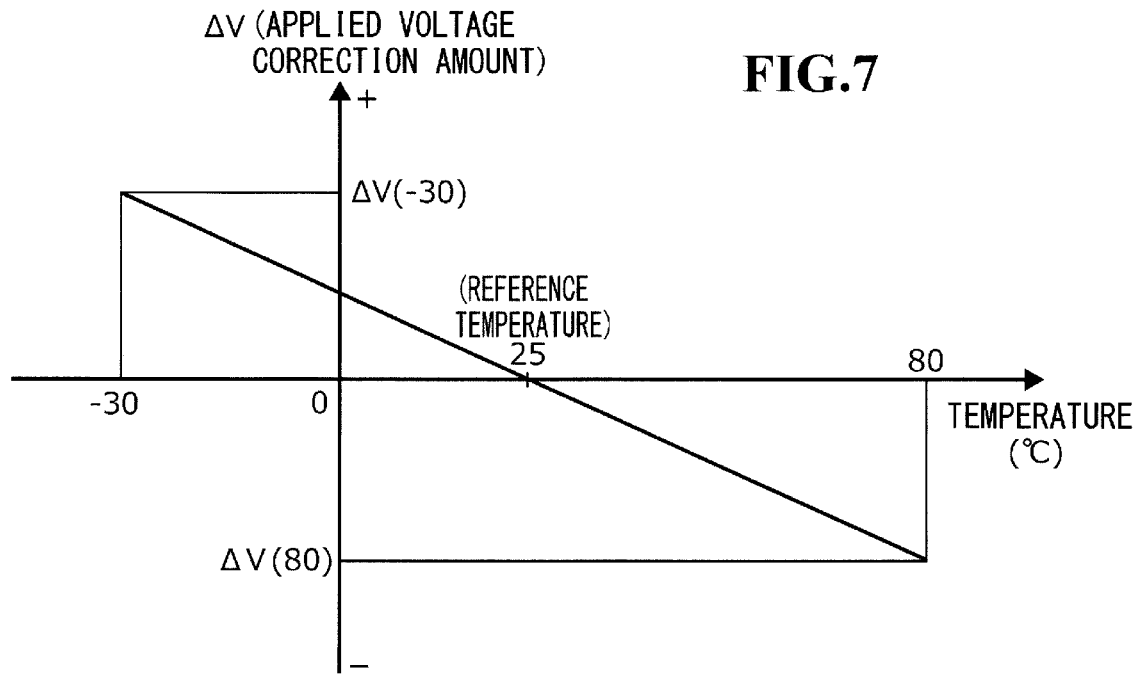
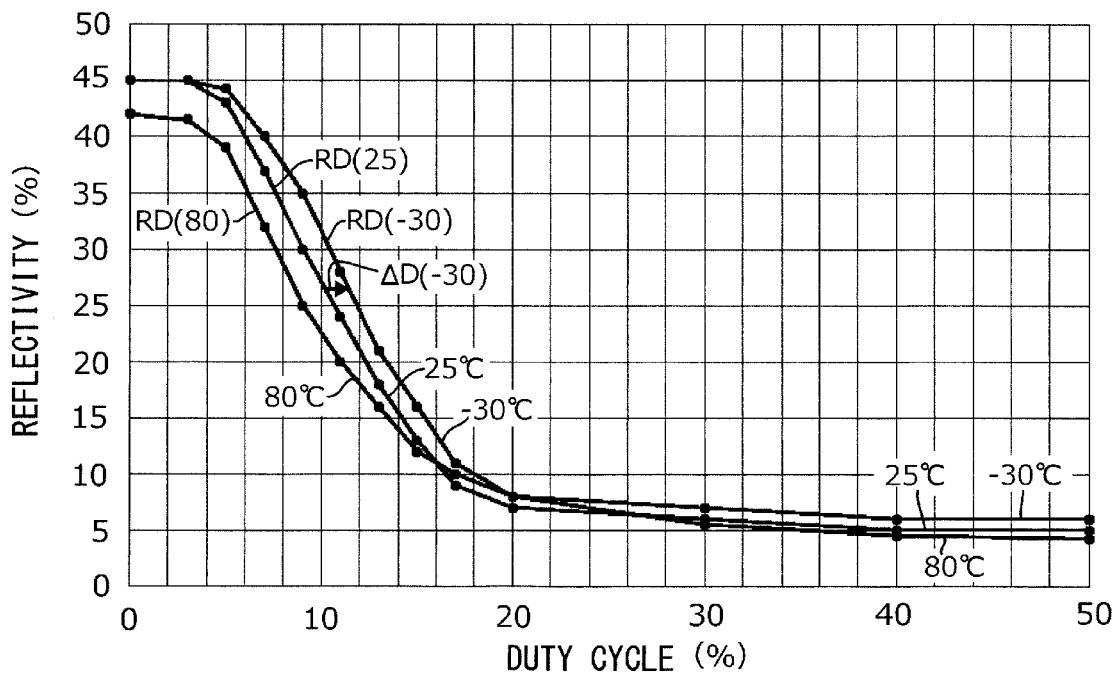

MIRROR DISPLAY APPARATUS

The disclosure of Japanese Patent Application No. 2020-001986 filed on Jan. 9, 2020 including the specification, drawings, claims and abstract is incorporated herein by reference in its entirety.

BACKGROUND OF THE INVENTION

1. Field of the Invention

This invention relates to a mirror display apparatus including a mirror optical element on the front side of a monitor display device to enable switching between a monitor mode and a mirror mode in use.

2. Description of the Related Art

As examples of mirror display apparatuses each including a mirror optical element on the front side of a monitor display device to enable switching between a monitor mode and a mirror mode in use, there are ones described in Japanese Patent No. 4348061, Japanese Patent Laid-Open No. 2009-008881 and International Publication No. WO 2018/061676. Here, the mirror optical element is an element having a reflectivity and a transmissivity that are changed in respective directions opposite to each other by means of electric driving so that the element can be changed, relatively, into a transmissive state in which the reflectivity is low and the transmissivity is high, a reflector state in which the reflectivity is high and the transmissivity is low and a reflectivity-reduced reflector state between these states, in a stepwise manner or steplessly, and reversibly.

This invention provides a mirror display apparatus that drives a mirror optical element using a pulse voltage to enable changing a reflectivity in a mirror mode in a stepwise manner or steplessly by means of a duty cycle of the pulse voltage.

SUMMARY OF THE INVENTION

A mirror display apparatus according to this invention includes a monitor display device, a mirror optical element disposed on a front side of a display surface of the monitor display device, and a control circuit, the mirror optical element includes a liquid-crystal panel with a reflection-type polarizer disposed on a back side thereof, the mirror optical element is an element having a reflectivity and a transmissivity that are changed in respective directions opposite to each other via electric driving using a voltage applied to the liquid-crystal panel so that the element can be changed into a transmissive state in which the reflectivity is low and the transmissivity is high, relatively, a reflector state in which the reflectivity is high and the transmissivity is low, relatively, and a reflectivity-reduced reflector state between these states, in a stepwise manner or steplessly, and reversibly, the control circuit is configured to be capable of performing operation mode switching control to set an operation mode of the mirror display apparatus by performing switching between a monitor mode and a mirror mode, the monitor mode is an operation mode including at least an operating state in which the monitor display device is set in a display state and the mirror optical element is set in the transmissive state, the mirror mode is an operation mode including at least an operating state in which the monitor display device is set in a non-display state and the mirror optical element is set in the reflector state or the reflectivity-reduced reflector state, and the control circuit is configured to be capable of performing reflectivity and transmissivity change control to use a pulse voltage as the voltage applied to the liquid-crystal panel and change a duty cycle of the pulse voltage to change the reflectivity and the transmissivity of the mirror optical element. Accordingly, a reflectivity of the mirror display apparatus can be changed by means of the duty cycle of the pulse voltage applied to the liquid-crystal panel of the mirror optical element.

In this invention, it is possible that: the mirror display apparatus includes a temperature sensor; and the control circuit is configured to be capable of, in the mirror mode in which the mirror optical element is set in the reflectivity-reduced reflector state, performing temperature compensation control to adjust the duty cycle of the pulse voltage applied to the liquid-crystal panel according to a temperature detected by the temperature sensor to curb fluctuation in reflectivity of the mirror display apparatus due to temperature. Accordingly, in the mirror mode in which the mirror optical element is set in the reflectivity-reduced reflector state, fluctuation in reflectivity of the mirror display apparatus due to temperature can be curbed.

In this invention, it is possible that: the mirror display apparatus includes a duty cycle characteristic memory that with regard to a duty cycle-reflectivity or transmissivity characteristic that is a characteristic of the reflectivity or the transmissivity of the mirror optical element relative to the duty cycle of the pulse voltage, stores (that is, stores, in the form of, e.g., a lookup table or an arithmetic expression; hereinafter, "lookup table" is referred to as "table") a plurality of the duty cycle-reflectivity or transmissivity characteristics according to temperatures; and the control circuit is configured to be capable of performing temperature compensation control to, according to the temperature detected by the temperature sensor, adjust the duty cycle of the pulse voltage based on the duty cycle-reflectivity or transmissivity characteristic at the relevant temperature, as the temperature compensation control. Accordingly, in the mirror mode in which the mirror optical element is set in the reflectivity-reduced reflector state, fluctuation in reflectivity of the mirror display apparatus due to temperature can be curbed by adjusting the duty cycle of the pulse voltage with reference to the duty cycle-reflectivity or transmissivity characteristic according to the detected temperature.

In this invention, it is possible that: the mirror display apparatus includes a duty cycle characteristic memory that with regard to a duty cycle-reflectivity or transmissivity characteristic that is a characteristic of the reflectivity or the transmissivity of the mirror optical element relative to the duty cycle of the pulse voltage, stores (that is, stores, in the form of, e.g., a table or an arithmetic expression) a reference characteristic that is the duty cycle-reflectivity or transmissivity characteristic at a predetermined reference temperature, and a duty cycle correction amount characteristic memory that stores (that is, stores, in the form of, e.g., a table or an arithmetic expression) a temperature-duty cycle correction amount characteristic for correcting an amount of shift of the duty cycle in the reference characteristic due to a temperature change relative to the reference characteristic, the temperature-duty cycle correction amount characteristic being a characteristic of a correction amount for the duty cycle relative to a temperature; and the control circuit is configured to be capable of performing temperature compensation control to obtain a correction amount for the duty cycle from the temperature-duty cycle correction amount characteristic according to the temperature detected by the temperature sensor, and adjust the duty cycle of the pulse voltage based on a characteristic obtained by shifting the duty cycle in the reference characteristic by the obtained correction amount, as the temperature compensation control. Accordingly, in the mirror mode in which the mirror optical element is set in the reflectivity-reduced reflector state, fluctuation in reflectivity of the mirror display apparatus due to temperature can be curbed by adjusting the duty cycle of the pulse voltage based on the characteristic obtained by shifting the duty cycle in the reference characteristic by the correction amount obtained from the temperature-duty cycle correction amount characteristic according to the detected temperature.

In this invention, it is possible that: the mirror display apparatus includes a duty cycle characteristic memory that with regard to a duty cycle-reflectivity or transmissivity characteristic that is a characteristic of the reflectivity or the transmissivity of the mirror optical element relative to the duty cycle of the pulse voltage, stores (that is, stores, in the form of, e.g., a table or an arithmetic expression) a plurality of the duty cycle-reflectivity or transmissivity characteristics according to temperatures, and a duty cycle correction amount characteristic memory that stores (that is, stores, in the form of, e.g., a table or an arithmetic expression) a temperature-duty cycle correction amount characteristic for, relative to a reference characteristic of the duty cycle-reflectivity or transmissivity characteristics, the reference characteristic being the duty cycle-reflectivity or transmissivity characteristic at a predetermined reference temperature, correcting an amount of shift of the duty cycle in the reference characteristic due to a temperature change, the temperature-duty cycle correction amount characteristic being a characteristic of a correction amount for the duty cycle relative to a temperature; and the control circuit is configured to be capable of, if the temperature detected by the temperature sensor is in a predetermined first temperature range, performing first temperature compensation control to, according to the temperature detected by the temperature sensor, adjust the duty cycle of the pulse voltage based on the duty cycle-reflectivity or transmissivity characteristic at the relevant temperature, and if the temperature detected by the temperature sensor is in a predetermined second temperature range that is lower than the first temperature range, performing second temperature compensation control to obtain a correction amount for the duty cycle from the temperature-duty cycle correction amount characteristic according to the temperature detected by the temperature sensor and adjust the duty cycle of the pulse voltage based on a characteristic obtained by shifting the duty cycle in the reference characteristic by the obtained correction amount, as the temperature compensation control. Accordingly, in the mirror mode in which the mirror optical element is set in the reflectivity-reduced reflector state, fluctuation in reflectivity of the mirror display apparatus due to temperature can be curbed by, if the detected temperature is in the predetermined first temperature range, adjusting the duty cycle of the pulse voltage by means of the first temperature compensation control, and if the detected temperature is in the second temperature range that is lower than the first temperature range, adjusting the duty cycle of the pulse voltage by means of the second temperature compensation control.

In this invention, it is possible that the control circuit is configured to be capable of, if the temperature detected by the temperature sensor is equal to or exceeds a predetermined control switching temperature, performing the first temperature compensation control, and if the temperature detected by the temperature sensor is lower than the control switching temperature, performing the second temperature compensation control. Accordingly, in the first temperature range, which is relatively high in temperature, the first temperature compensation control can be performed, and in the second temperature range, which is relatively low in temperature, the second temperature compensation control can be performed, with the control switching temperature as a boundary therebetween.

In this invention, it is possible that the control switching temperature is set to be equal to the reference temperature. Accordingly, switching between the first temperature compensation control and the second temperature compensation control can be performed with the reference temperature as a boundary therebetween.

In this invention, it is possible that the duty cycle characteristic memory stores (that is, stores, in the form of, e.g., a table or an arithmetic expression) the duty cycle-reflectivity or transmissivity characteristic with regard to a temperature in the first temperature range and does not store the duty cycle-reflectivity or transmissivity characteristic with regard to a temperature in the second temperature range. Accordingly, the duty cycle characteristic memory does not store the duty cycle-reflectivity or transmissivity characteristic with regard to a temperature in the second temperature range, so that a data storage amount of the duty cycle characteristic memory can be reduced in comparison with a case where duty cycle-reflectivity or transmissivity characteristics are stored with regard to temperatures in all the temperature ranges.

In this invention, it is possible that the control circuit is configured to be capable of performing the second temperature compensation control only for a temperature range in which the duty cycle-reflectivity or transmissivity characteristics can be regarded as characteristics with the respective duty cycles shifted from each other. Accordingly, in a temperature range in which the duty cycle-reflectivity or transmissivity characteristics can be regarded as characteristics with respective duty cycles shifted from each other, fluctuation in reflectivity of the mirror display apparatus due to temperature can be curbed by means of the second temperature compensation control.

In this invention, it is possible that the control circuit is configured to be capable of, in the mirror mode in which the mirror optical element is set in the reflector state, performing control to set the duty cycle of the pulse voltage applied to the liquid-crystal panel to a fixed duty cycle that enables the mirror optical element to be maintained in the reflector state irrespective of the temperature detected by the temperature sensor. Accordingly, in the mirror mode in which the mirror optical element is set in the reflector state, the temperature compensation control to adjust the duty cycle of the pulse voltage applied to the liquid-crystal panel according to a temperature can be prevented from being performed, enabling reduction of a processing load on the control circuit.

In this invention, it is possible that the control circuit is configured to be capable of, in the monitor mode in which the mirror optical element is set in the transmissive state, performing control to set the duty cycle of the pulse voltage applied to the liquid-crystal panel to a fixed duty cycle that enables the mirror optical element to be maintained in the transmissive state irrespective of the temperature detected by the temperature sensor. Accordingly, in the monitor mode in which the mirror optical element is set in the transmissive state, the temperature compensation control to adjust the duty cycle of the pulse voltage applied to the liquid-crystal panel according to a temperature can be prevented from being performed, enabling reduction of a processing load on the control circuit.

In this invention, it is possible that the control circuit is configured to be capable of in the monitor mode, performing temperature control of the monitor display device by adjusting a luminance of the monitor display device based on the temperature detected by the temperature sensor or is configured to be capable of performing display quality-related temperature compensation control of the monitor display device by adjusting a driving state of the monitor display device according to a display signal based on the temperature detected by the temperature sensor, or is configured to be capable of performing both the temperature control and the display quality-related temperature compensation control. Accordingly, in the monitor mode, the temperature sensor can be used for either or both of the temperature control of the monitor display device and the display quality-related temperature compensation control of the monitor display device, and in the mirror mode in which the mirror optical element is set in the reflectivity-reduced reflector state, the temperature sensor can be used for temperature compensation control for the reflectivity or the transmissivity of the mirror optical element. Note that examples of related art configured to maintain display quality of a display device by adjusting a driving state of the display device according to an environmental temperature include the techniques described in Japanese Patent Laid-Open Nos. 2000-267629 and 2004-317908.

BRIEF DESCRIPTION OF THE DRAWINGS

FIG. 2 is a schematic diagram illustrating the embodiment of a physical system configuration of an inner mirror for a vehicle where a mirror display apparatus of this invention is applied to the inner mirror for a vehicle, and is a vertical sectional view illustrating a schematic configuration of the mirror display apparatus cut along a plane orthogonal to a mirror surface and a display surface of the mirror display apparatus;

FIG. 3 is an exploded perspective view of the mirror optical element in FIG. 2;

FIG. 7 is a graph indicating an example of a temperature-applied voltage correction amount characteristic where the reflectivity of the mirror optical element is changed by means of a voltage value of a driving alternating-current voltage, that is, a characteristic of a correction amount (that is, a shift amount) for an applied voltage relative to an applied voltage-reflectivity characteristic at a predetermined reference temperature where a temperature changes from the reference temperature;

FIG. 8A is a graph indicating an example of a duty cycle-reflectivity characteristic where the reflectivity of the mirror optical element is changed by means of a duty cycle of driving pulses, and indicates the characteristic at each of a plurality of temperatures;

DETAILED DESCRIPTION OF THE PREFERRED EMBODIMENT

Figure 1:
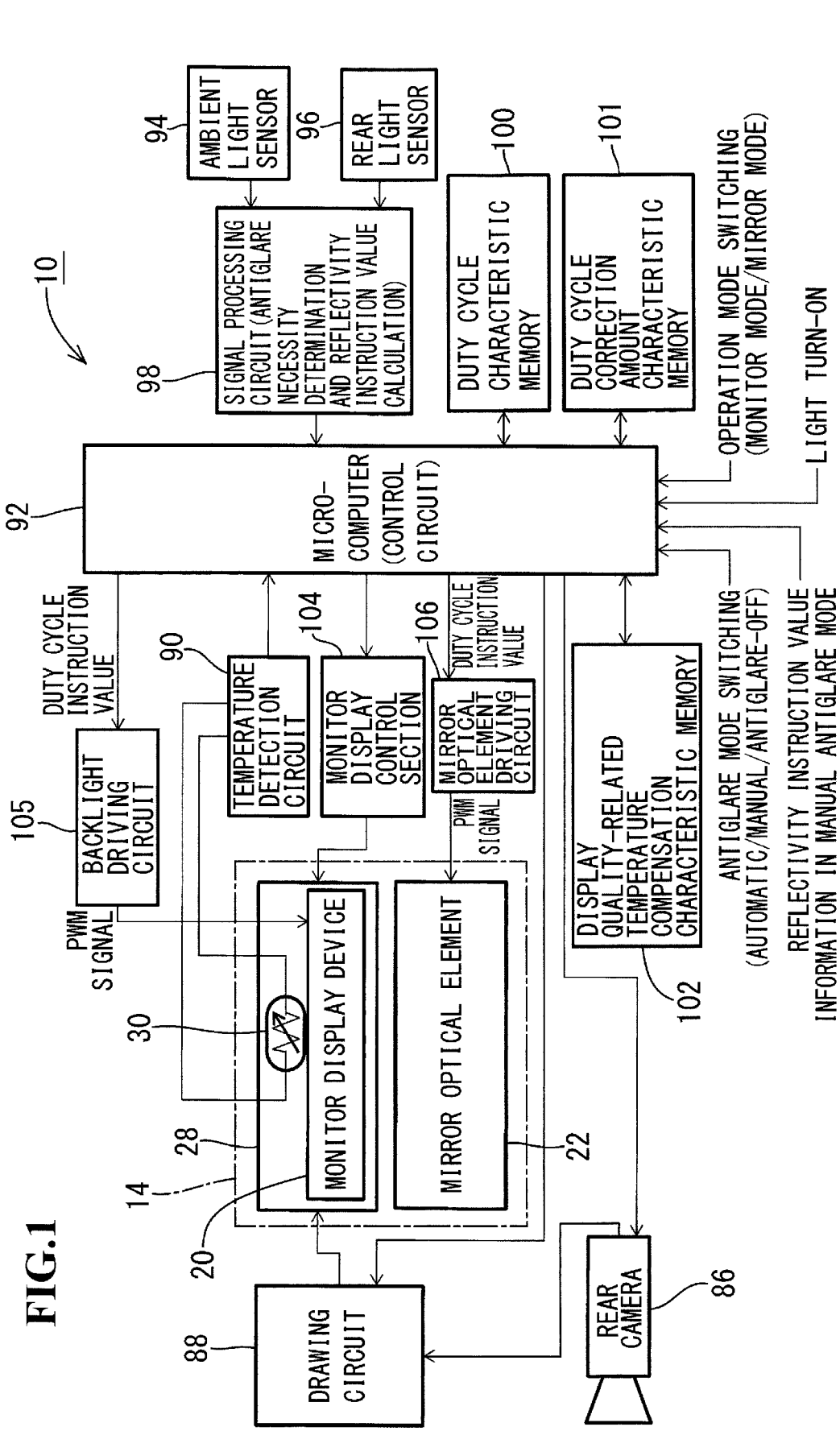
FIG. 1 is a block diagram illustrating an embodiment of a control system configuration of the mirror display apparatus in FIG. 2.

An embodiment of this invention where a mirror display apparatus of this invention is applied to an inner mirror for a vehicle will be described. The inner mirror for a vehicle has a configuration in which a physical mirror (that is, a mirror formed of a reflector) and an electronic mirror (that is, a light emitting-type monitor display device made of, e.g., liquid-crystal) behind the physical mirror are disposed in a stack on a viewed surface (that is, a display surface viewed by a viewer). The physical mirror is of a reflectivity/transmissivity-variable type using a mirror optical element. Also, the electronic mirror, that is, the monitor display device is one that functions as a camera monitor of a rear camera. The inner mirror for a vehicle is one that enables switching between functions of both mirrors (that is, the physical mirror and the electronic mirror) in use by changing a reflectivity and a transmissivity of the physical mirror in respective directions opposite to each other. Here, the inner mirror for a vehicle is referred to as "electronic inner mirror". An operation mode of the electronic inner mirror can be switched between "mirror mode" and "monitor mode" via a switching operation (e.g., a manual operation or a voice operation) by a driver or automatic switching. The mirror mode is an operation mode for using the physical mirror. The monitor mode is an operation mode for using the electronic mirror, that is, the monitor display device.

The mirror mode can further be switched among "automatic antiglare mode", "manual antiglare mode" and "antiglare-off mode" via a switching operation (e.g., a manual operation or a voice operation) by a driver. Note that in the below description, the automatic antiglare mode and the manual antiglare mode may collectively be referred to as "antiglare mode". The automatic antiglare mode is an operation mode in which control for changing the reflectivity of the physical mirror into a non-antiglare state (for example, a state in which the reflectivity is maximum and the transmissivity is minimum) and an antiglare state (that is, a state in which the reflectivity is lowered relative to the non-antiglare state) is automatically performed in a stepwise manner (that is, in two or more steps) or steplessly according to a relationship between an ambient light amount (that is, an amount of light around the vehicle) and a rear light amount (that is, an amount of light behind the vehicle). The automatic antiglare mode enables automatic adjustment of the reflectivity of the physical mirror to a proper reflectivity that prevents excessive hindrance of viewability of a rear-side image and reduces glare of reflected light for a driver at night-time. The manual antiglare mode is an operation mode in which the reflectivity of the physical mirror is changed into the non-antiglare state and the antiglare state in a stepwise manner (that is, in two or more steps) or steplessly via an arbitrary change operation (e.g., a manual operation or a voice operation) by a driver. The manual antiglare mode enables a driver to adjust the reflectivity of the physical mirror to a reflectivity according to his/her preference. The antiglare-off mode is an operation mode in which an automatic antiglare function and a manual antiglare function are turned off and the reflectivity of the physical mirror is fixed in the non-antiglare state. Note that in each of a case where an ignition key position of the vehicle is an off position and a case where power to the inner mirror for a vehicle is lost, no power is supplied to the inner mirror for a vehicle and the inner mirror for a vehicle enters a state that is substantially the same as the antiglare-off mode, ensuring a rear view function by the physical mirror.

In the monitor mode, the monitor display device is turned on (that is, is made to enter a light emitting state and a display state) and the physical mirror is made to enter a transmissive state in which the reflectivity is lowered relative to that of a reflectivity-reduced reflector state (for example, a state in which the reflectivity is reduced to the minimum and the transmissivity is raised to the maximum). Consequently, an image picked up by the rear camera and displayed on the monitor display device appears on the viewed surface of the electronic inner mirror. On the other hand, in the mirror mode, the monitor display device is turned off (that is, is made to enter a non-light emitting state and a non-display state) and the physical mirror is made to enter the non-antiglare state or the antiglare state. Consequently, a reflected image in the non-antiglare state or the antiglare state via the physical mirror appears on the viewed surface of the electronic inner mirror.

FIG. 2 illustrates a schematic configuration of a physical system configuration of an electronic inner mirror 10 (that is, a mirror display apparatus) according to this invention. Like general inner mirrors, the electronic inner mirror 10 is supported so as to hang from a ceiling or a windshield via a non-illustrated stay at a center position in a right-left direction of an upper front portion of a cabin of a vehicle. In the electronic inner mirror 10, an electronic mirror element 14 and a circuit board 16 are housed and fixedly supported in an inner space 12a of a housing 12. The electronic mirror element 14 is disposed at a position at which the electronic mirror element 14 closes an opening 12b of the inner space 12a. In this state, a viewed surface 14a of the electronic mirror element 14 faces space outside the housing 12 and is viewed from a viewpoint 18 of a driver. On the viewed surface 14a, a reflective surface of a physical mirror (that is, a mirror optical element 22) in the mirror mode and an image displayed on a monitor display device 20 in the monitor mode appear selectively according to the operation mode of the electronic inner mirror 10. The circuit board 16 is disposed at a position behind the electronic mirror element 14 and cannot be viewed from the space outside the housing 12. The electronic mirror element 14 and the circuit board 16 are fixedly supported by respective structure parts (not illustrated) formed at an inner wall surface of the housing 12, the inner wall surface facing the inner space 12a.

FIG. 3 illustrates components of the electronic mirror element 14. The electronic mirror element 14 includes the monitor display device 20, and the mirror optical element 22 disposed on the front side of a display surface 20a of the monitor display device 20. The monitor display device 20 and the mirror optical element 22 are integrated by attaching respective peripheral edges of the display device 20 and the mirror optical element 22, the peripheral edges facing each other, to each other via a double-sided tape 21, thereby forming the electronic mirror element 14. Note that it is possible to integrate the monitor display device 20 and the mirror optical element 22 without using the double-sided tape 21, by attaching the mirror optical element 22 directly to a surface of the monitor display device 20 via, e.g., an adhesive.

A structure of the integrated electronic mirror element 14 will be described with reference to FIG. 2. The monitor display device 20 is formed of a full-color monitor LCD capable of displaying a high-definition moving image. In other words, the monitor display device 20 includes a color liquid-crystal panel 24 made of, e.g., full-color TFT liquid-crystal and backlight 26 stacked on the back side of the color liquid-crystal panel 24. For a light source of the backlight 26, for example, white light-emitting diodes are used. The backlight 26 is on when the monitor display device 20 is on (in an operating state, that is, a display state), and is off when the monitor display device 20 is off (in a non-operating state, that is, a non-display state). A frame body 28 made of metal (for example, iron) is put and fitted on a stack 25 of the color liquid-crystal panel 24 and the backlight 26. The frame body 28 covers an entire back surface, entire side surfaces and entire front peripheral edges of the stack 25 (see FIG. 3). A temperature sensor 30 is housed and disposed at a proper position on the inner peripheral side of the frame body 28. The temperature sensor 30 is formed of, for example, a variable resistance-type temperature sensor (thermistor). In this embodiment, as illustrated in FIGS. 2 and 3, the temperature sensor 30 is received and fixedly disposed in a space 32 formed between an inner peripheral surface of the frame body 28 and an upper end surface of the stack 25 at a center portion in a longitudinal direction of an upper edge of the frame body 28. The mirror optical element 22 is formed of a TN (twisted nematic)-type liquid-crystal panel including a reflection-type polarizer disposed on the back side thereof. A reflectivity and a transmissivity of the mirror optical element 22 change in respective directions opposite to each other according to an effective driving voltage. Here, the effective driving voltage is an alternating-current voltage value in the case of voltage driving and is an alternating-current equivalent value according to a duty cycle in the case of PWM (pulse width modulation) driving. In other words, when the effective driving voltage is zero (in a state in which a zero voltage is applied, that is, no voltage is applied), the reflectivity has a maximum value and the transmissivity has a minimum value (that is, the reflector state). When the effective driving voltage is raised, the reflectivity is gradually lowered and the transmissivity is gradually raised (that is, the reflectivity-reduced reflector state). Then, when the effective driving voltage reaches a predetermined value or more, the reflectivity substantially reaches a minimum value and the transmissivity substantially reaches a maximum value, and thus, saturation (that is, a transmissive state) is reached. The monitor display device 20 and the mirror optical element 22 are integrated in a close-contact manner by attaching the respective peripheral edges (that is, respective positions corresponding to a position of a bezel 28*a* forming the front peripheral edges of the frame body 28) of respective opposed surfaces of the monitor display device 20 and the mirror optical element 22 to each other via the double-sided tape 21.

In this embodiment, PWM driving of the mirror optical element 22 is performed and the reflectivity and the transmissivity of the mirror optical element 22 are changed in respective directions opposite to each other by means of a duty cycle of a PWM voltage for the PWM driving (that is, a PWM-method pulse voltage applied to the mirror optical element 22 for driving). The PWM voltage is a pulse voltage that alternately changes to opposite, positive and negative, polarities at a predetermined cycle so as to prevent generation of a direct-current component that deteriorates liquid-crystal (see FIG. 5). With regard to both positive and negative polarity waveforms (that is, a positive-side waveform and a negative-side waveform) of the pulse voltage, an amplitude and a pulse width are the same between both waveforms. The amplitude is fixed and the pulse width changes. A duty cycle of the pulse voltage can change in a range from 0% to 50%. If the duty cycle is lowered, the reflectivity of the mirror optical element 22 is raised, and if the duty cycle is raised, the reflectivity of the mirror optical element 22 is lowered. If the duty cycle is 0% (that is, a state in which a zero-voltage is applied), the mirror optical element 22 is in a reflector state with a maximum reflectivity (for example, a reflectivity of 42%) and a minimum transmissivity (that is, a state in the antiglare-off mode). When the duty cycle is 50%, the mirror optical element 22 is in a transmissive state with a minimum reflectivity (for example, a reflectivity of 10%) and a maximum transmissivity (that is, a state in the monitor mode). When the duty cycle is a duty cycle between 0% and 50%, the mirror optical element 22 has a reflectivity between the maximum reflectivity and the minimum reflectivity (for example, a reflectivity of less than 42% but more than 10%). The duty cycle in the antiglare mode can change, for example, in a range from 0% to 50% (or a range that is narrower than the range). Consequently, the reflectivity of the mirror optical element 22 in the antiglare mode can change in a range from the maximum reflectivity (for example, a reflectivity of 42%) to the minimum reflectivity (for example, a reflectivity of 10%) (or a range that is narrower than the range). In this embodiment, the amplitude of the PWM voltage is fixed irrespective of the duty cycle (however, if the duty cycle is 0%, there is no amplitude, that is, a zero voltage is maintained). In other words, the amplitude of the PWM voltage is set to an amplitude sufficient (same amplitude in both positive and negative directions) for maintaining the minimum reflectivity (maximum transmissivity) when the duty cycle is 50%, irrespective of temperature change within a guaranteed operating temperature range (for example, from −30 to 80 degrees centigrade).

In FIG. 2, operating states of the monitor display device 20 and the mirror optical element 22 of the electronic mirror element 14 are changed as follows, according to the operation mode of the electronic inner mirror 10.

<<Monitor Mode>>

The monitor display device 20 is turned on (at this time, the backlight 26 is turned on). A pulse voltage with a duty cycle fixed at 50% is applied to the mirror optical element 22. Consequently, the monitor display device 20 provides luminescent display of an image and the mirror optical element 22 enters a transmissive state. As a result, the image on the monitor display device 20 is viewed from the viewpoint 18 of the driver through the mirror optical element 22. In the monitor mode, the monitor display device 20 generates heat by the backlight 26 being turned on. At this time, a temperature of the monitor display device 20 is detected by the temperature sensor 30. Based on the temperature detection, display quality-related temperature compensation control is performed with regard to driving of the color liquid-crystal panel 24 of the monitor display device 20. Also, upon the detected temperature reaching a predetermined value or more, a luminance of the backlight 26 is automatically reduced, and as a result, an excessive temperature increase is curbed. In the monitor mode, a pulse voltage with a duty cycle fixed at 50% only needs to be applied to the mirror optical element 22, and temperature compensation control of the mirror optical element 22 is unnecessary.

<<Mirror Mode>>

The monitor display device 20 is turned off (at this time, the backlight 26 is turned off). In the antiglare-off mode, a pulse voltage with a duty cycle fixed at 0% is applied to the mirror optical element 22, and in the antiglare mode, a pulse voltage with a duty cycle that changes in a range from 0% to 50% (or a range that is narrower than the range) is applied to the mirror optical element 22. Consequently, the monitor display device 20 provides no display. Also, in the antiglare-off mode, the reflectivity of the mirror optical element 22 is fixed in the reflector state (that is, the maximum reflectivity), and in the antiglare mode, the reflectivity of the mirror optical element 22 changes in a range from the reflector state (that is, the maximum reflectivity) to the transmissive state (that is, the minimum reflectivity) (or a range that is narrower than the range). As a result, in the antiglare-off mode, a non-antiglare reflected image is viewed from the viewpoint 18 of the driver. Also, in the antiglare mode, where the reflectivity of the mirror optical element 22 is set to be lower than the maximum reflectivity, an antiglare reflected image is viewed from the viewpoint 18 of the driver. At this time, since the monitor display device 20 is off and the backlight 26 thus generates no heat, the temperature detected by the temperature sensor 30 is an environmental temperature of an area around the monitor display device 20. Therefore, the detected temperature can be regarded as a temperature of the mirror optical element 22. In the antiglare mode, temperature compensation control is performed by performing control to change the duty cycle of the pulse voltage applied to the mirror optical element 22 according to the temperature of the mirror optical element 22 detected by the temperature sensor 30 so that a designated reflectivity is maintained irrespective of the environmental temperature. Here, the designated reflectivity is an arbitrary reflectivity variably designated via a change operation by the driver or a reflectivity automatically variably designated according to a relationship between an ambient light amount and a rear-side light amount. In other words, if the duty cycle is fixed to an intermediate duty cycle between 0% and 50%, when the temperature is low, the reflectivity of the mirror optical element 22 becomes high, and when the temperature is high, the reflectivity of the mirror optical element 22 becomes low (see FIG. 8A). Therefore, in the antiglare mode, when the temperature detected by the temperature sensor 30 is low, the duty cycle of the pulse voltage is raised, and as the detected temperature becomes higher, the duty cycle of the pulse voltage is made to be lower. By the temperature compensation control of the duty cycle being performed in real time, in the antiglare mode, the reflectivity designated automatically or via a manual operation is maintained irrespective of the temperature of the mirror optical element 22. In the antiglare-off mode, a pulse voltage with a duty cycle fixed at 0% is applied (that is, no voltage is applied) to the mirror optical element 22, and thus, the temperature compensation control of the mirror optical element 22 is unnecessary. Also, in the mirror mode, in each of the antiglare-off mode and the antiglare mode, the monitor display device 20 is off, and thus, the temperature compensation control of the monitor display device 20 is unnecessary.

According to the above operation, the temperature sensor 30 is not used for control of the mirror optical element 22 during a period in which the temperature sensor 30 is used for control of the monitor display device 20, and is not used for control of the monitor display device 20 during a period in which the temperature sensor 30 is used for control of the mirror optical element 22. In other words, there is no period in which the temperature sensor 30 is used simultaneously for control of the monitor display device 20 and control of the mirror optical element 22. Therefore, no problem arises resulting from the temperature sensor 30 being shared between control of the monitor display device 20 and control of the mirror optical element 22. Also, a control circuit (microcomputer 92 in FIG. 1) does not need to simultaneously perform both controls using the temperature sensor 30 in parallel and thus, a processing load on the control circuit is small.

Figure 4:
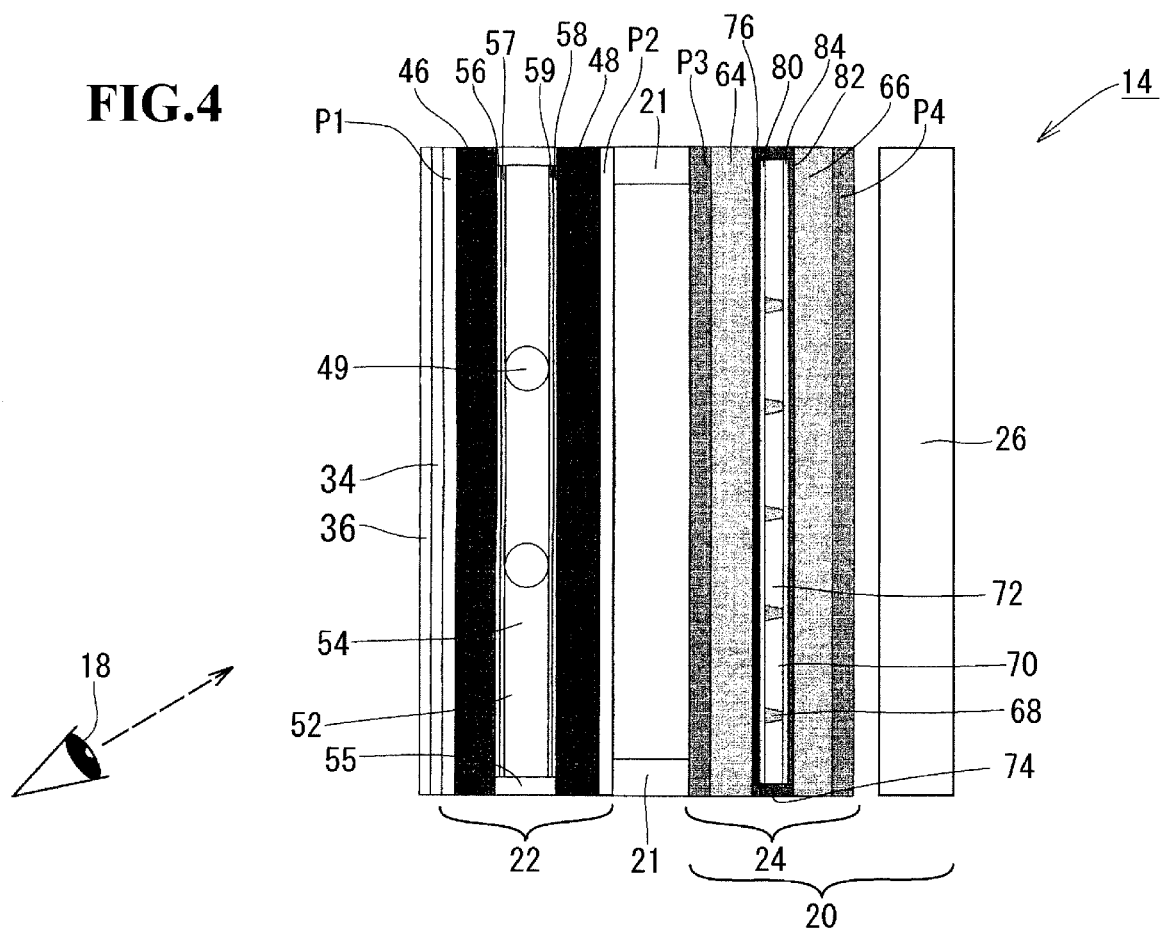
FIG. 4 is a sectional view schematically illustrating an example of a layer structure of an electronic mirror element in FIG. 2.

Here, a detailed example of a layer structure of the electronic mirror element 14 will be described with reference to FIG. 4. Note that in FIG. 4, illustration of the frame body 28 and the temperature sensor 30 is omitted. In FIG. 4, the left side of the electronic mirror element 14 is the front side of the electronic mirror element 14 and the right side of the electronic mirror element 14 is the back side of the same. The viewpoint 18 of the driver is positioned on the front side of the electronic mirror element 14. The mirror optical element 22 has a structure in which two glass substrates 46, 48 are made to face each other across spacers 49 to form a gap (liquid-crystal enclosing section) 52 between the glass substrates 46, 48. TN-type liquid-crystal 54 is enclosed in the liquid-crystal enclosing section 52. An entire outer periphery of the liquid-crystal enclosing section 52 is sealed by a sealing material 55 (adhesive). ITO transparent electrode films 56, 58 are formed on respective inner surfaces (that is, opposed surfaces) of the glass substrates 46, 48. Oriented films 57, 59 are formed on respective surfaces of the ITO transparent electrode films 56, 58. An absorption-type polarizer P1 is attached to a surface on the front side of the front-side glass substrate 46. The absorption-type polarizer P1 is configured and respective directions of an absorption polarization axis and a transmission polarization axis thereof are set, to absorb horizontally polarized light (which refers to light polarized in a horizontal direction, that is, a transverse direction) and transmit vertically polarized light (which refers to light polarized in a vertical direction, that is, a direction perpendicular to the transverse direction). A reflection-type polarizer P2 is attached to a surface on the back side of the back-side glass substrate 48. The reflection-type polarizer P2 is configured and respective directions of a reflection polarization axis and a transmission polarization axis thereof are set, to reflect horizontally polarized light and transmit vertically polarized light. For the reflection-type polarizer P2, for example, a DBEF (registered trademark) manufactured by 3M Company can be used.

A high-retardation film 34 is attached to a front surface of the mirror optical element 22 via, e.g., an adhesive. By the high-retardation film 34 being disposed, where the driver wears polarized glasses, favorable viewability can be ensured with regard to an image in the monitor mode and a reflected image in the mirror mode, irrespective of an angle of observation by the driver. In other words, the high-retardation film 34 converts an image or a reflected image of vertically polarized light emitted from the electronic mirror element 14 toward the viewpoint 18 of the driver into non-polarized light. Consequently, the driver wearing polarized glasses can view the image or the reflected image well irrespective of the angle of observation by the driver. A retardation R(0) in vertical incidence on the high-retardation film 34 can be set to, for example, around 3000 nm.

A protection layer 36 that protects the high-retardation film 34 from damage, breakage, etc., is formed on a front surface of the high-retardation film 34. The protection layer 36 is formed of, e.g., a hard coating layer or a glass plate. The protection layer 36 formed of a hard coating layer can be formed by, for example, applying a hard coating material (e.g., an acrylic-based hard coating resin) to the front surface of the high-retardation film 34 to form the hard coating layer. The protection layer 36 formed of a glass plate can be formed by, for example, attaching a glass plate to the front surface of the high-retardation film 34 via, e.g., an adhesive.

On the other hand, the monitor display device 20 is formed of a color monitor LCD. In other words, the monitor display device 20 includes the color liquid-crystal panel 24, and the backlight 26 disposed on the back side of the color liquid-crystal panel 24. The color liquid-crystal panel 24 has a structure in which a gap (liquid-crystal enclosing section) 70 is formed between two glass substrates 64, 66 by disposing the glass substrates 64, 66 so as to face each other across a spacer 68. IPS (in-plane switching)-type liquid-crystal 72 is enclosed in the liquid-crystal enclosing section 70. An entire outer periphery of the liquid-crystal enclosing section 70 is sealed by a sealing material 74. An absorption-type polarizer P3 is attached to a surface on the front side of the front-side glass substrate 64 (color filter substrate). The absorption-type polarizer P3 is configured and respective directions of an absorption polarization axis and a transmission polarization axis thereof are set, to absorb horizontally polarized light and transmit vertically polarized light. A color filter 76 and an oriented film 80 are sequentially stacked on a surface on the back side (that is, a surface facing the glass substrate 66) of the glass substrate 64. An array film 82 including a TFT circuit and an ITO transparent electrode film (pixel electrodes), and an oriented film 84 are sequentially stacked on a surface on the front side (that is, a surface facing the glass substrate 64) of the back-side glass substrate 66 (array substrate). An absorption-type polarizer P4 is attached to a surface on the back side of the glass substrate 66. The absorption-type polarizer P4 is configured and respective directions of a transmission polarization axis and an absorption polarization axis thereof are set, to transmit horizontally polarized light and absorb vertically polarized light. Transmission, absorption or reflection of horizontally polarized light and vertically polarized light by the polarizers P1 to P4 are summarized in the following table. Note that in the table, "or absorb" and "or transmit" in parentheses with regard to the polarizer P4 mean that the polarizer P4 disposed on the back side of the glass substrate 66 on the back side of the monitor display device 20 may be one having a cross Nicol arrangement in which the respective directions of the polarization axes are disposed orthogonal to those of the polarizer P3 disposed on the front surface side of the glass substrate 66 or one having a parallel Nicol arrangement in which the respective directions of the polarization axes are disposed in parallel with those of the polarizer P3.

|  | P1 (absorption type) | P2 (reflection type) | P3 (absorption type) | P4 (absorption type) |
|---|---|---|---|---|
| Horizontally polarized light: | absorb | reflect | absorb | transmit (or absorb) |
| Vertically polarized light: | transmit | transmit | transmit | absorb (or transmit) |

Operation in each of the operation modes of the electronic mirror element 14 having the layer structure in FIG. 4 will be described.

<<Monitor Mode>>

A pulse voltage having a duty cycle of 50% is applied to the mirror optical element 22. In other words, a PWM signal that makes liquid-crystal molecules in the TN-type liquid-crystal 54 fully rise is applied to the mirror optical element 22. Also, the monitor display device 20 is turned on. In other words, the backlight 26 is turned on and a driving signal is applied to the IPS-type liquid-crystal 72 on a pixel-by-pixel basis according to pixels of an image. At this time, image light that is vertically polarized light is emitted from the absorption-type polarizer P3 at the outermost surface of the monitor display device 20. The image light penetrates the mirror optical element 22 as it is, and is guided to the viewpoint 18 of the driver and viewed by the driver. At this time, outside light incident on the mirror optical element 22 enters the absorption-type polarizer P1. A horizontally polarized light component of the entered outside light is absorbed by the absorption-type polarizer P1. Also, a vertically polarized light component of the outside light penetrates the mirror optical element 22, enters the monitor display device 20, penetrates the absorption-type polarizer P3 and is absorbed by the absorption-type polarizer P4. Therefore, the vertically polarized light component is not returned to the viewpoint 18 of the driver.

<<Antiglare-Off Mode of Mirror Mode>>

A pulse voltage having a duty cycle of 0% is applied to the mirror optical element 22. In other words, no voltage is applied (that is, a zero voltage is applied) to the TN-type liquid-crystal 54. Also, the monitor display device 20 is turned off. In other words, the backlight 26 is turned off, and no driving signal is applied to the IPS-type liquid-crystal 72. At this time, outside light incident on the mirror optical element 22 enters the absorption-type polarizer P1. A vertically polarized light component of the entered outside light penetrates the absorption-type polarizer P1. A polarization direction of the penetrated vertically polarized light is rotated by 90 degrees by the TN-type liquid-crystal 54 and thereby becomes horizontally polarized light. The horizontally polarized light is reflected by the reflection-type polarizer P2 having the reflection polarization axis set in the horizontal direction. A polarization direction of the reflected horizontally polarized light is rotated by 90 degrees by the TN-type liquid-crystal 54 and thereby becomes vertically polarized light. The vertically polarized light penetrates the absorption-type polarizer P1 having the transmission polarization axis set in the vertical direction and is guided to the viewpoint 18 of the driver. Consequently, a high-reflectivity reflector state can be obtained.

<<Antiglare Mode of Mirror Mode>>

A PWM pulse voltage having a duty cycle that changes in a range from 0% to 50% (or a range that is narrower than the range) is applied to the mirror optical element 22. A PWM signal having an intermediate duty cycle between 0% and 50%, which corresponds to an effective driving voltage that makes the liquid-crystal molecules of the TN-type liquid-crystal 54 not fully rise, is applied to the mirror optical element 22. Consequently, a reflectivity-reduced reflector state in which the reflectivity is reduced in comparison with that in the antiglare-off mode can be obtained. Also, the monitor display device 20 is turned off. In other words, the backlight 26 is turned off and no driving signal is applied to the IPS-type liquid-crystal 72. At this time, outside light incident on the mirror optical element 22 enters the absorption-type polarizer P1. A vertically polarized light component of the entered outside light penetrates the absorption-type polarizer P1. The penetrated vertically polarized light enters the TN-type liquid-crystal 54. At this time, where a pulse voltage having an intermediate duty cycle between 0% and 50%, which makes the liquid-crystal molecules of the TN-type liquid-crystal 54 not fully rise, is applied to the TN-type liquid-crystal 54, the entered vertically polarized light does not become perfectly horizontally polarized light. In other words, a part of the vertically polarized light penetrates the reflection-type polarizer P2 and a remaining part of the vertically polarized light is reflected by the reflection-type polarizer P2. The reflected polarized light penetrates the TN-type liquid-crystal 54, and a part of the polarized light penetrates the absorption-type polarizer P1 and is guided to the viewpoint 18 of the driver. Consequently, a reflectivity-reduced reflector state in which the reflectivity is reduced in comparison with that in the antiglare-off mode is obtained. Temperature compensation control is performed by correcting the duty cycle of the pulse voltage in real time according to the temperature of the mirror optical element 22 detected by the temperature sensor 30, allowing the reflectivity designated automatically or a manual operation to be maintained even if there is a change in temperature.

Figure 5:
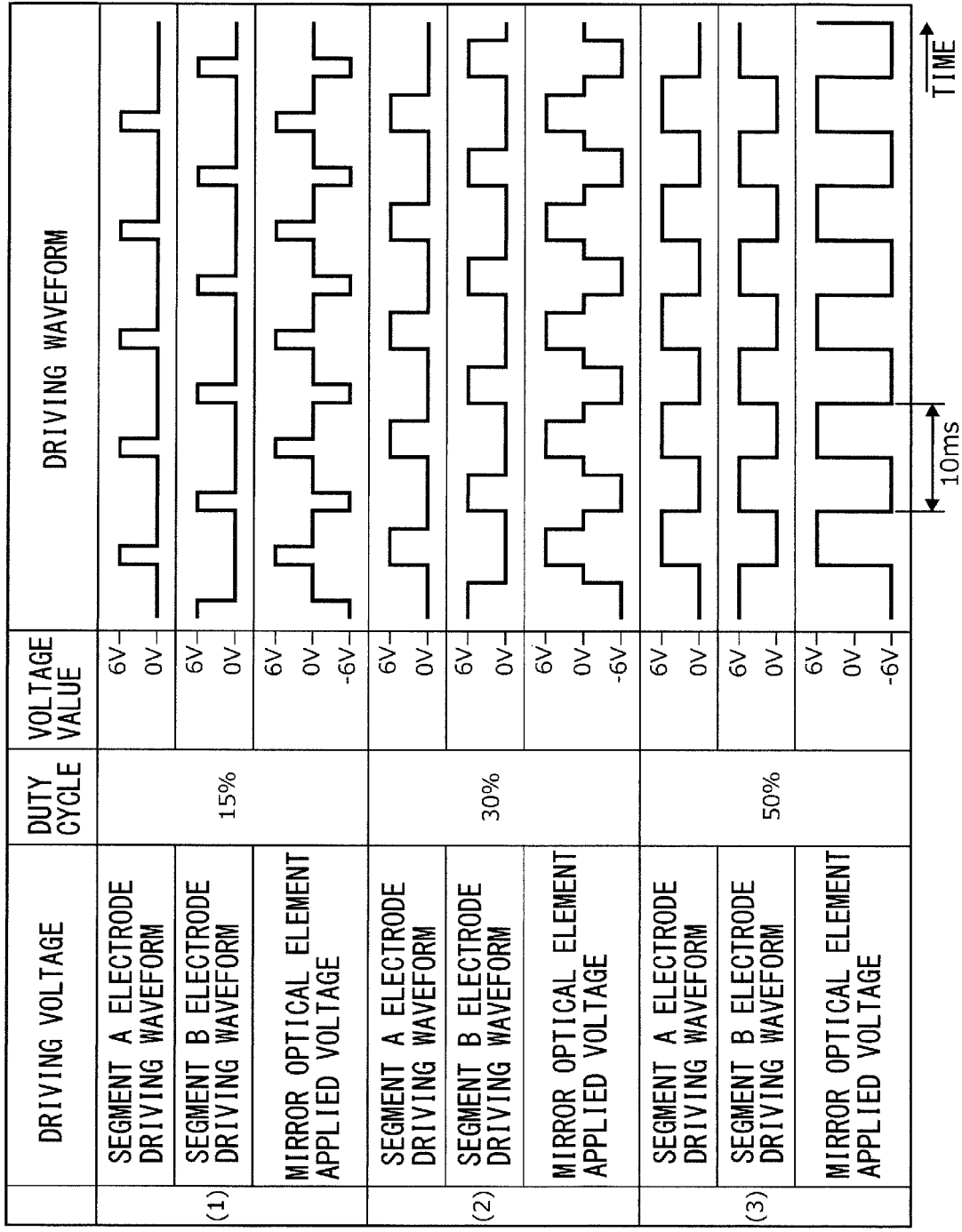
FIG. 5 is a waveform diagram illustrating examples of a driving pulse voltage applied between opposed electrodes of a liquid-crystal panel of the mirror optical element in FIG. 4.

Examples of the pulse voltage applied to the mirror optical element 22 will be described with reference to FIG. 5. FIG. 5 indicates respective cases where the duty cycle of the pulse voltage applied to the mirror optical element 22 is (1) 15%, (2) 30% and (3) 50%. In each of the cases of the duty cycles, the "segment A electrode driving waveform" is a waveform of a driving voltage applied to the ITO transparent electrode film 56 forming one of opposed electrodes in the mirror optical element 22 in FIG. 4. The "segment B electrode driving waveform" is a waveform of a driving voltage applied to the ITO transparent electrode film 58 forming the other of the opposed electrodes. The "mirror optical element applied voltage" is a waveform of a driving pulse voltage for the mirror optical element 22, the driving pulse voltage being applied between the ITO transparent electrode films 56, 58 by both of these driving voltages. The driving pulse voltage for the mirror optical element 22 is a voltage that is a difference between the segment A electrode driving waveform and the segment B electrode driving waveform. In other words, the driving pulse voltage for the mirror optical element 22 is a pulse voltage that swings in both the positive and negative directions with a voltage of 0 V as a center and with an amplitude fixed at ±6 V. A pulse width is maintained to be the same between positive and negative pulses and a duty cycle changes in a range from 0% to 50%. Therefore, no direct-current component that deteriorates the liquid-crystal enclosed in the mirror optical element 22 (that is, the TN-type liquid-crystal 54 enclosed in the liquid-crystal enclosing section 52 in FIG. 4) is generated. A frequency of the driving pulse voltage for the mirror optical element 22 is in a range, for example, from 60 Hz to 1 kHz. A frequency in such range enables driving of the liquid-crystal of the mirror optical element 22 to follow the driving voltage. In other words, during each of respective periods in which the driving voltage is maintained at +6 V or −6 V, the mirror optical element 22 has the minimum reflectivity and the maximum transmissivity. Also, during each of periods in which the driving voltage is 0 V, the mirror optical element 22 has the maximum reflectivity and the minimum transmissivity. For the frequency of the driving pulse voltage for the mirror optical element 22, for example, a frequency within the range from 60 Hz to 1 kHz, the frequency not interfering with, e.g., a driving frequency for the monitor display device 20 and causing, e.g., no flicker, can be selected. As a result, a reflectivity and a transmissivity according to a ratio between a length of a period in which the driving voltage is +6 V or −6 V and a length of a period in which the driving voltage is 0 V are provided for human eyes. FIG. 5 indicates a case where the frequency of the driving pulse voltage for the mirror optical element 22 is 100 Hz (that is, a cycle is 10 milliseconds).

Where the duty cycle of the driving pulse voltage for the mirror optical element 22 is 0% not indicated in FIG. 5 (at this time, each of the segment A electrode driving waveform, the segment B electrode driving waveform and the mirror optical element applied voltage exhibits 0 V and is constant and generates no pulses), the mirror optical element 22 is in a reflector state with the maximum reflectivity and the minimum transmissivity. This state is a state in the antiglare-off mode of the mirror mode. Each of cases where an ignition key position of the vehicle is an off position and where the power to the inner mirror for a vehicle is lost, also, the mirror optical element 22 is in a state that is the same as this state.

Where the duty cycle of the driving pulse voltage for the mirror optical element 22 is 15% in FIG. 5(1), the reflectivity of the mirror optical element 22 is lowered a little and the transmissivity of the mirror optical element 22 is raised a little in comparison with the case where the duty cycle is 0%.

Where the duty cycle of the driving pulse voltage for the mirror optical element 22 is 30% in FIG. 5(2), the reflectivity of the mirror optical element 22 is further lowered and the transmissivity of the mirror optical element 22 is further raised in comparison with the case where the duty cycle is 15%.

Where the duty cycle of the driving pulse voltage for the mirror optical element 22 is 50% in FIG. 5(3), the mirror optical element 22 has the minimum reflectivity and the maximum transmissivity. This is a state in the monitor mode.

In the antiglare mode of the mirror mode, the duty cycle of the driving pulse voltage for the mirror optical element 22 changes, automatically or via a manual operation, in a range from 0% to 50% (or a range that is narrower than the range from 0% to 50%) in a stepwise manner (that is, in two or more steps) or steplessly, and the reflectivity of the mirror optical element 22 changes accordingly. In other words, where the duty cycle is 0%, the mirror optical element 22 is in a state that is the same as that in the antiglare-off mode of the mirror mode, that is, has the maximum reflectivity. Where the duty cycle is 50%, the mirror optical element 22 is in a state that is the same as that in the monitor mode, that is, has the minimum reflectivity. Where the duty cycle is larger than 0% but smaller than 50%, the reflectivity of the mirror optical element 22 changes according to the duty cycle, and as the duty cycle is higher, the reflectivity is lower.

Figure 6A:
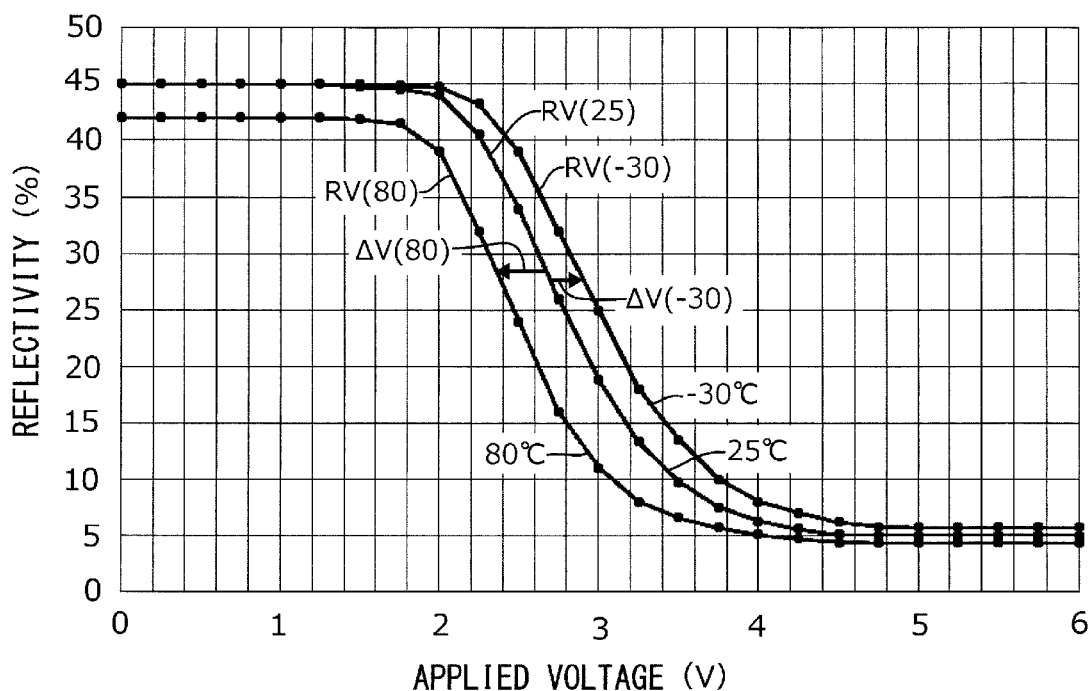
FIG. 6A is a graph indicating an example of an applied voltage-reflectivity characteristic where a reflectivity of the mirror optical element is changed by means of voltage control of a driving voltage, and indicates the characteristic at each of a plurality of temperatures.

A characteristic of the reflectivity of the mirror optical element 22 relative to the driving signal (driving signal-reflectivity characteristic) and change of the characteristic by a temperature will be described. First, a characteristic where the mirror optical element 22 is subjected to voltage driving will be described. FIG. 6A indicates an applied voltage-reflectivity characteristic (in this embodiment, "reflectivity" refers to total light reflectivity) where the reflectivity of the mirror optical element 22 is changed by means of voltage control of a driving alternating-current voltage and indicates the characteristic at each of a plurality of temperatures. RV(−30), RV(25) and RV(80) indicate the respective characteristics at −30 degrees centigrade, 25 degrees centigrade and 80 degrees centigrade. If the temperature of the mirror optical element 22 is 25 degrees centigrade, the reflectivity of the mirror optical element 22 changes as indicated by the characteristic RV(25). In other words, if the applied voltage is around 0 V to 2 V, the maximum reflectivity is maintained. If the applied voltage is around 2 V to 4 V, the reflectivity is lowered along with the rising of the voltage. If the applied voltage is around 4 V to 6 V, the minimum reflectivity is maintained. The characteristic RV(25) shifts in the applied voltage direction according to change in temperature of the mirror optical element 22. In other words, an applied voltage for maintaining a predetermined intermediate reflectivity (that is, a reflectivity between the maximum reflectivity and the minimum reflectivity) is lowered if the temperature of the mirror optical element 22 increases (for example, the characteristic RV(80)), and is raised if the temperature decreases (for example, the characteristic RV(−30)).

In response to the characteristic that changes according to the temperature in this way, for example, the following temperature control method can be performed. An applied voltage-reflectivity characteristic for each predetermined unit temperature is obtained based on tests with regard to a guaranteed operating temperature range (for example, from −30 to 80 degrees centigrade) and stored in the table in advance. Then, in the antiglare mode, according to the detected temperature of the mirror optical element 22, an applied voltage value corresponding to a reflectivity instruction value designated automatically or via a manual operation is read from the applied voltage-reflectivity characteristic at the relevant temperature. Next, an applied voltage value of the mirror optical element 22 is controlled to the read value. Hereinafter, this method is referred to as "table method in voltage driving". Consequently, in the antiglare mode, the reflectivity designated by the reflectivity instruction value can be maintained irrespective of temperature change.

As another temperature compensation control method, the following method can be performed. From among applied voltage-reflectivity characteristics obtained for respective predetermined unit temperatures based on tests with regard to a guaranteed operating temperature range (for example, from −30 to 80 degrees centigrade), an applied voltage-reflectivity characteristic at a predetermined temperature (reference temperature) is stored (that is, stored in the form of a table or an arithmetic expression) in a memory in advance as a reference characteristic. In addition to this, a characteristic for correcting a shift amount of an applied voltage relative to a temperature is also stored (that is, stored in the form of a table or an arithmetic expression) in a memory in advance as a temperature-applied voltage correction amount characteristic. Then, in the antiglare mode, a correction amount for an applied voltage is read or calculated from the temperature-applied voltage correction amount characteristic according to the detected temperature of the mirror optical element 22. Subsequently, according to the characteristic obtained by shifting the reference characteristic in the applied voltage direction by the correction amount, the applied voltage is controlled, and thereby the reflectivity of the mirror optical element 22 is controlled. Hereinafter, this method is referred to as "shift method in voltage driving".

As a specific example of the shift method in voltage driving, examples of the reference characteristic and the temperature-applied voltage correction amount characteristic based on the applied voltage-reflectivity characteristic in FIG. 6A and an example of reflectivity control of the mirror optical element 22 in the antiglare mode based on these characteristics will be described. As a reference characteristic for the applied voltage-reflectivity characteristic, the characteristic at 25 degrees centigrade in FIG. 6A is stored in advance in the relevant memory (that is, stored in the form of a table or an arithmetic expression). On the other hand, as an temperature-applied voltage correction amount characteristic relative to the reference characteristic, for example, the temperature-applied voltage correction amount characteristic indicated in FIG. 7, which has been obtained based on results of the above tests, is stored in advance in the relevant memory (that is, stored in the form of a table or an arithmetic expression).

Figure 6B:
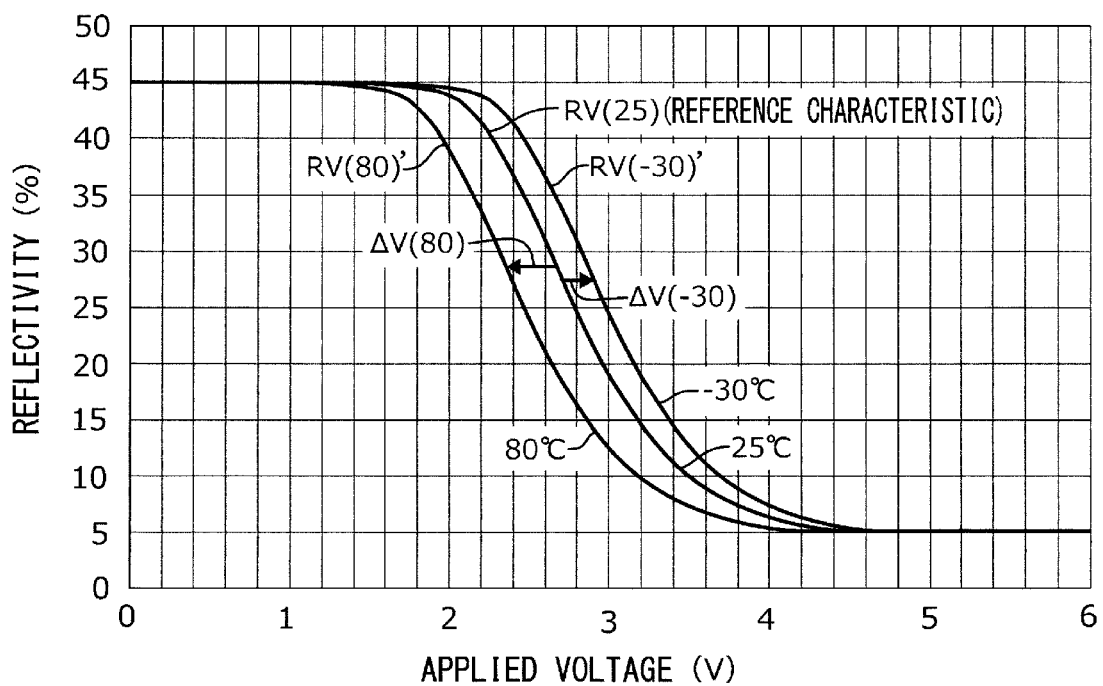
FIG. 6B is a graph for describing an example of a temperature compensation method where the reflectivity of the mirror optical element is changed by means of voltage control of a driving voltage.

FIG. 6B schematically indicates examples of temperature compensation operation for the applied voltage-reflectivity characteristic in the antiglare mode. According to the detected temperature of the mirror optical element 22, a correction amount for an applied voltage at the relevant temperature is obtained from the temperature-applied voltage correction amount characteristic in FIG. 7. Subsequently, an applied voltage value is obtained for achieving a reflectivity instruction value based on a characteristic obtained by shifting the reference characteristic RV(25) of the applied voltage-reflectivity characteristic in the applied voltage direction by the correction amount. For example, if the detected temperature is −30 degrees centigrade, a correction amount ΔV(−30) for an applied voltage at −30 degrees centigrade is obtained from the temperature-applied voltage correction amount characteristic in FIG. 7. Next, using the characteristic RV(−30)' in FIG. 6B obtained by shifting the reference characteristic RV(25) in FIG. 6B in the positive direction by ΔV(−30) with regard to the applied voltage, an applied voltage value for achieving the reflectivity instruction value is obtained from the characteristic RV(−30)'. Also, if the detected temperature is 80 degrees centigrade, a correction amount ΔV(80) for an applied voltage at 80 degrees centigrade is obtained from the temperature-applied voltage correction amount characteristic in FIG. 7. Subsequently, using the characteristic RV(80)' in FIG. 6B obtained by shifting the reference characteristic RV(25) in FIG. 6B in the negative direction by ΔV(80) with regard to the applied voltage, an applied voltage value for achieving the reflectivity instruction value is obtained from the characteristic RV(80)'. Likewise, if the detected temperature is a temperature t between −30 degrees centigrade and 80 degrees centigrade, a correction amount ΔV(t) for an applied voltage at the temperature t is obtained from the temperature-applied voltage correction amount characteristic in FIG. 7. Subsequently, using a characteristic RV(t)' obtained by shifting the reference characteristic RV(25) in FIG. 6B by ΔV(t) with regard to the applied voltage, an applied voltage value for achieving the reflectivity instruction value is obtained from the characteristic RV(t)'. Consequently, the reflectivity designated by the reflectivity instruction value is substantially achieved with regard to the mirror optical element 22 irrespective of temperature change.

Next, a characteristic where the mirror optical element 22 is subjected to pulse voltage driving (PWM driving) will be described. FIG. 8A indicates a duty cycle-reflectivity characteristic where the reflectivity of the mirror optical element 22 is changed by means of duty cycle control of a driving pulse voltage and indicates the characteristic at each of a plurality of temperatures. RD(−30), RD(25) and RD(80) denote respective characteristics at −30 degrees centigrade, 25 degrees centigrade and 80 degrees centigrade. A waveform of the pulse voltage is as indicated in FIG. 5 and is a waveform having a fixed amplitude of ±6 V and a duty cycle that changes. In FIG. 8A, if the temperature of the mirror optical element 22 is 25 degrees centigrade, the reflectivity of the mirror optical element 22 changes as indicated in the characteristic RD(25). In other words, if the duty cycle is substantially 0% to 3%, the maximum reflectivity is maintained. If the duty cycle is substantially 3% to 20%, the reflectivity is lowered along with rising of the duty cycle. If the duty cycle is substantially 20% to 50%, the minimum reflectivity is maintained. This characteristic changes according to the temperature of the mirror optical element 22. In other words, a duty cycle for maintaining a predetermined intermediate reflectivity is lowered when the temperature of the mirror optical element 22 increases (for example, the characteristic RD(80)), and is raised when the temperature decreases (for example, the characteristic RD(−30)). However, unlike the case of voltage driving, the characteristic is not one obtained by simply shifting the characteristic in the duty cycle direction according to the temperature. More specifically, a characteristic when the temperature is −30 degrees centigrade is a characteristic obtained by shifting the characteristic where the temperature is 25 degrees centigrade in the positive direction with regard to the duty cycle. On the other hand, a characteristic when the temperature is 80 degrees centigrade is not a characteristic obtained by simply shifting the characteristic where the temperature is 25 degrees centigrade in the negative direction with regard to the duty cycle, but is a characteristic that is different in characteristic shape itself from the characteristic where the temperature is 25 degrees centigrade. In other words, the characteristic when the temperature is 80 degrees centigrade is a characteristic in which change in reflectivity relative to change in duty cycle is small (that is, the gradient of the characteristic graph is small) in comparison with the characteristic at 25 degrees centigrade in a range in which the reflectivity is substantially lower than 25%.

In response to the characteristic that changes according to the temperature in this way, for example, the following temperature control method can be performed. A duty cycle-reflectivity characteristic for each predetermined unit temperature is obtained based on tests with regard to a guaranteed operating temperature range (for example, from −30 to 80 degrees centigrade) is obtained and stored in a table in advance. Then, in the antiglare mode, according to the detected temperature of the mirror optical element 22, a duty cycle according to a reflectivity instruction value designated automatically or via a manual operation is read from the duty cycle-reflectivity characteristic at the relevant temperature. Subsequently, the duty cycle of the driving pulse voltage for the mirror optical element 22 is controlled to the read value. Hereinafter, this method is referred to as "table method in pulse voltage driving". Consequently, in the antiglare mode, the reflectivity designated by the reflectivity instruction value can be maintained irrespective of temperature change.

Figure 9:
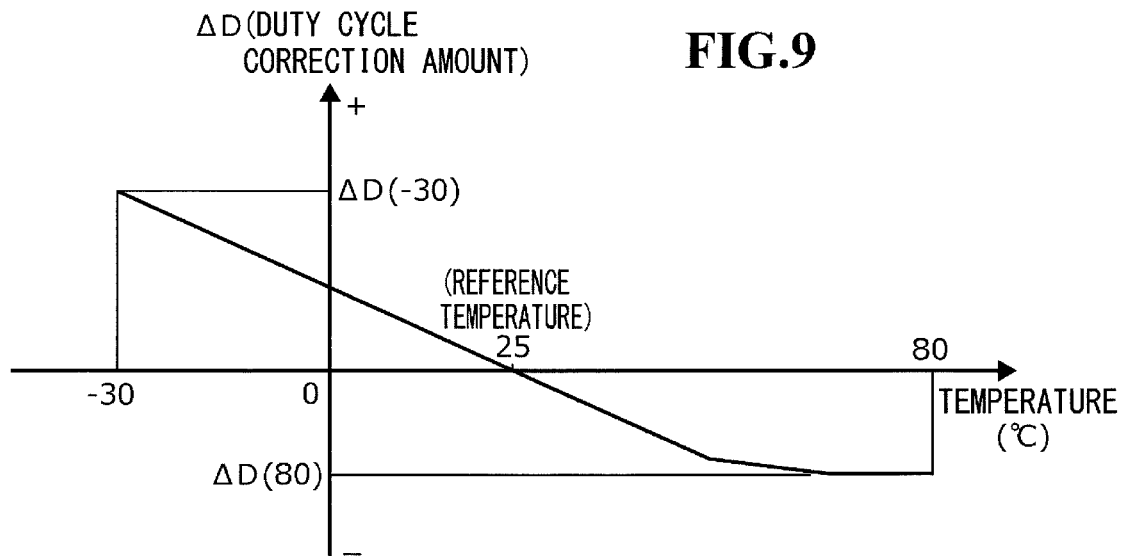
FIG. 9 is a graph indicating a temperature-duty cycle correction amount characteristic where the reflectivity of the mirror optical element is changed by means of a duty cycle of driving pulses, that is, an example of a characteristic of a correction amount (that is, a shift amount) for a duty cycle relative to a duty cycle-reflectivity characteristic at a predetermined reference temperature where a temperature changes from the reference temperature, and specifically indicates a temperature-duty cycle correction amount characteristic used in a shift method (described later) in pulse voltage driving.

As another temperature compensation control method, the following method can be performed. From among duty cycle-reflectivity characteristics obtained in advance based on tests for respective predetermined unit temperatures with regard to a guaranteed operating temperature range (for example, from −30 to 80 degrees centigrade), a duty cycle-reflectivity characteristic at a predetermined temperature (reference temperature) is stored (that is, stored in the form of a table or an arithmetic expression) in a memory in advance as a reference characteristic. In addition to this, a characteristic for correcting a shift amount of a duty cycle relative to a temperature is also stored (that is, stored in the form of a table or an arithmetic expression) in a memory in advance as a temperature-duty cycle correction amount characteristic. Then, in the antiglare mode, a correction amount for a duty cycle is read or calculated from the temperature-duty cycle correction amount characteristic according to the detected temperature of the mirror optical element 22. Subsequently, according to a characteristic obtained by shifting the reference characteristic in the duty cycle direction by the correction amount, the duty cycle is controlled, and thereby the reflectivity of the mirror optical element 22 is controlled. Hereinafter, this method is referred to as "shift method in pulse voltage driving". FIG. 9 indicates an example of the temperature-duty cycle correction amount characteristic used in the shift method in pulse voltage driving. Examples of a method for setting the temperature-duty cycle correction amount characteristic can include the following two methods.

Setting method 1: storing duty cycle correction amounts for respective temperatures in the form of a table in the memory.

Setting method 2: storing a temperature-duty cycle correction amount characteristic in the form of an arithmetic expression (for example, a set of arithmetic expressions for respective predetermined temperature sections) in the memory. For example, it is possible to set one arithmetic expression for a range from −30 degrees centigrade to a degree centigrade just short of 40 degrees centigrade and set a plurality of arithmetic expressions for respective units of 10 degrees centigrade in a range from 40 to 80 degrees centigrade.

However, in the case of pulse voltage driving, as stated above, a duty cycle-reflectivity characteristic in a high temperature range is not a characteristic obtained by simply shifting a duty cycle-reflectivity characteristic when the temperature is low with regard to the duty cycle. Rather, a shape of the characteristic itself is different from that of the characteristic when the temperature is low. In other words, the duty cycle-reflectivity characteristic when the temperature is high is a characteristic in which change in reflectivity relative to change in duty cycle is small (that is, the gradient of the characteristic graph is small) in a range in which the reflectivity is low in comparison with the characteristic when the temperature is low. Therefore, according the shift method in pulse voltage driving, if a reflectivity instruction value is low, the reflectivity of the mirror optical element 22 is somewhat changed by a temperature change (that is, a change from a low temperature to a high temperature or vice versa) even though the reflectivity instruction value is unchanged.

Therefore, in order to curb fluctuation of the reflectivity due to temperature change, switching temperature compensation control methods between a range in which the temperature is high and a range in which the temperature is low is conceivable. Hereinafter, this method is referred to as "composite method in pulse voltage driving". In other words, duty cycle-reflectivity characteristics for respective predetermined unit temperatures are obtained in advance based on tests with regard to a guaranteed operating temperature range (for example, from −30 to 80 degrees centigrade). Then, the following procedure is performed with regard to a range in which the temperature is high (first temperature range), the range having a duty cycle-reflectivity characteristic that is not a characteristic obtained by simply shifting in the duty cycle direction according to the temperature. The duty cycle-reflectivity characteristics for the respective unit temperatures are stored in advance in the form of a table. According to the detected temperature of the mirror optical element 22, a duty cycle corresponding to a reflectivity instruction value is read from the duty cycle-reflectivity characteristic at the relevant temperature. The duty cycle of the driving pulse voltage for the mirror optical element 22 is controlled to the read value (first temperature compensation control). On the other hand, the following procedure is performed with regard to a range in which the temperature is low (second temperature range), the range having duty cycle-reflectivity characteristics substantially shifted from each other in the duty cycle direction according to the temperature. A duty cycle-reflectivity characteristic at a predetermined temperature (reference temperature) within the temperature range is stored as a reference characteristic in the memory (that is, stored in the form of a table or an arithmetic expression) in advance. In addition to this, a characteristic for correcting a shift amount of a duty cycle relative to a temperature is also stored (that is, stored in the form of a table or an arithmetic expression) in a memory in advance as a temperature-duty cycle correction amount characteristic. Then, according to the detected temperature of the mirror optical element 22, a correction amount for a duty cycle is read or calculated from the temperature-duty cycle correction amount characteristic. According to a characteristic obtained by shifting the reference characteristic in the duty cycle direction by the correction amount, the duty cycle is controlled, and thereby the reflectivity of the mirror optical element 22 is controlled (second temperature compensation control). In this way, according to the composite method in pulse voltage driving, fluctuation of the reflectivity due to temperature change can be curbed in comparison with the shift method in pulse voltage driving, by switching temperature compensation control methods between the range in which the temperature is high and the range in which the temperature is low (temperature at which control methods are switched is referred to as "control switching temperature").

Figure 10:
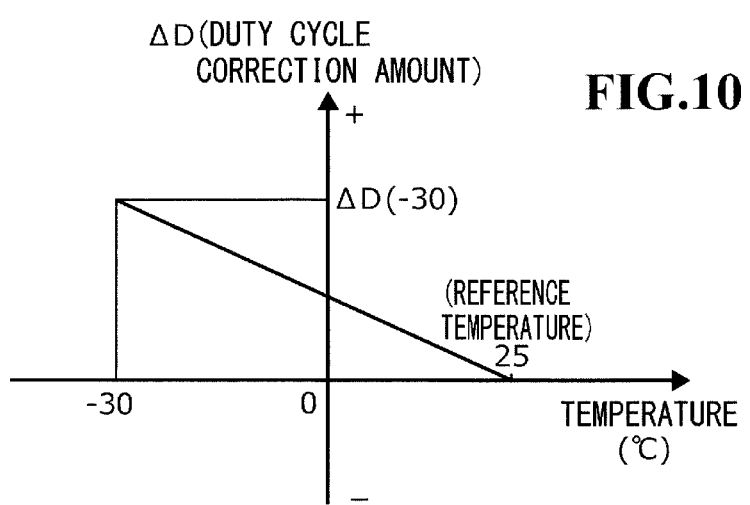
FIG. 10 is a graph indicating an example of a temperature-duty cycle correction amount characteristic where the reflectivity of the mirror optical element is changed by means of a duty cycle of driving pulses, that is, a characteristic of a correction amount (that is, a shift amount) for a duty cycle relative to a duty cycle-reflectivity characteristic at a predetermined reference temperature where a temperature changes from the reference temperature, and specifically indicates a temperature-duty cycle correction amount characteristic used in a composite method (described later) in pulse voltage driving.

As a specific example of the composite method in pulse voltage driving, examples of the reference characteristic and the temperature-duty cycle correction amount characteristic each obtained based on the duty cycle-reflectivity characteristic in FIG. 8A and an example of reflectivity control of the mirror optical element 22 performed based on the obtained characteristics will be described. Duty cycle-reflectivity characteristics for respective predetermined unit temperatures are obtained in advance based on tests with regard to a guaranteed operating temperature range (for example, from −30 to 80 degrees centigrade). As a result, for example, if characteristics in a range less than 25 degrees centigrade are substantially characteristics each obtained by shifting a characteristic at 25 degrees centigrade in the duty cycle direction, it is possible to set 25 degrees centigrade as the reference temperature. Where 25 degrees centigrade is set as the reference temperature, duty cycle-reflectivity characteristics for respective unit temperatures are stored in advance in the form of a table with regard to a temperature range of no less than 25 degrees centigrade (first temperature range) in the entire guaranteed operating temperature range. From among the stored characteristics, the characteristic RD(25) at 25 degrees centigrade in FIG. 8A is the reference characteristic. On the other hand, as a temperature-duty cycle correction amount characteristic relative to the reference characteristic RD(25), a characteristic obtained based on results of the aforementioned tests (for example, the temperature-duty cycle correction amount characteristic indicated in FIG. 10) is set in advance in the memory with regard to a temperature range less than 25 degrees centigrade (second temperature range) in the entire guaranteed operating temperature range. Examples of a method for setting the temperature-duty cycle correction amount characteristic can include setting methods 1 and 2 described above.

Figure 8B:
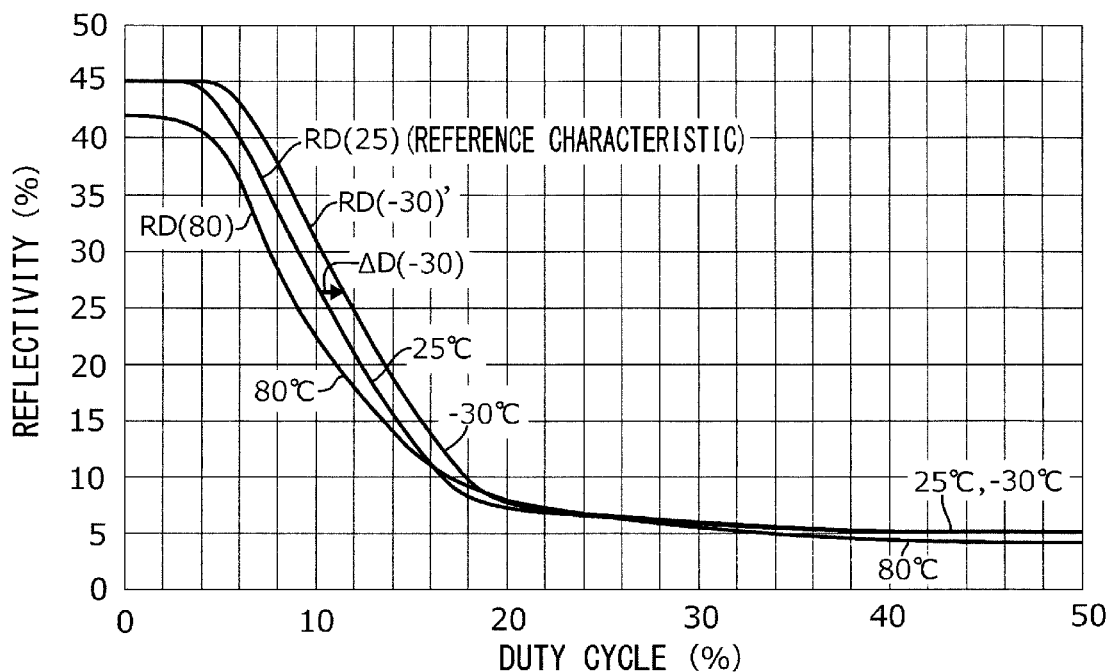
FIG. 8B is a graph for describing an example of a temperature compensation method where the reflectivity of the mirror optical element is changed by means of a duty cycle of driving pulses.

FIG. 8B schematically indicates examples of temperature compensation operation for the duty cycle-reflectivity characteristic. If the detected temperature of the mirror optical element 22 is 25 degrees centigrade or more, according to the detected temperature of the mirror optical element 22, a duty cycle corresponding to a reflectivity instruction value is read from the duty cycle-reflectivity characteristic at the relevant temperature and the duty cycle of the driving pulse voltage for the mirror optical element 22 is controlled to the read value. For example, if the detected temperature of the mirror optical element 22 is 80 degrees centigrade, a duty cycle for achieving the reflectivity instruction value is obtained from the duty cycle-reflectivity characteristic RD(80) at 80 degrees centigrade in FIG. 8B and the duty cycle of the driving pulse voltage for the mirror optical element 22 is controlled to the obtained value (first temperature compensation control). Likewise, if the detected temperature of the mirror optical element 22 is a temperature t between 25 degrees centigrade and 80 degrees centigrade, a duty cycle for achieving the reflectivity instruction value is obtained from a duty cycle-reflectivity characteristic RD(t) at the detected temperature of the mirror optical element 22 and the duty cycle of the driving pulse voltage for the mirror optical element 22 is controlled to the obtained value.

On the other hand, if the detected temperature of the mirror optical element 22 is less than 25 degrees centigrade, the following procedure is performed. According to the detected temperature of the mirror optical element 22, a duty cycle correction amount for the relevant temperature is obtained from the temperature-duty cycle correction amount characteristic (that is, obtained by being read from the table or calculation of the arithmetic expression). A duty cycle for achieving the reflectivity instruction value is obtained based on a characteristic obtained by shifting the reference characteristic for the duty cycle-reflectivity characteristic in the duty cycle direction by the correction amount. The duty cycle of the driving pulse voltage for the mirror optical element 22 is controlled to the obtained value. For example, if the detected temperature of the mirror optical element 22 is −30 degrees centigrade, the following procedure is performed. A duty cycle correction amount $\Delta D(-30)$ at −30 degrees centigrade is obtained from the temperature-duty cycle correction amount characteristic in FIG. 10. Using the characteristic RD(−30)' in FIG. 8B obtained by shifting the reference characteristic RD(25) in FIG. 8B in the positive direction by $\Delta D(-30)$ with regard to the duty cycle, a duty cycle for achieving the reflectivity instruction value is obtained from the characteristic RD(−30)'. The duty cycle of the driving pulse voltage for the mirror optical element 22 is controlled to the obtained value (second temperature compensation control). Likewise, if the detected temperature of the mirror optical element 22 is a temperature t between −30 degrees centigrade and 25 degrees centigrade, the following procedure is performed. A duty cycle correction amount $\Delta D(t)$ at the temperature t is obtained from the temperature-duty cycle correction amount characteristic in FIG. 10. Using a characteristic RD(t)' obtained by shifting the reference characteristic RD(25) in FIG. 8B in the negative direction by $\Delta D(t)$ with regard to the duty cycle, a duty cycle for achieving the reflectivity instruction value is obtained from the characteristic RD(t)'. The duty cycle of the driving pulse voltage for the mirror optical element 22 is controlled to the obtained value.

With the above duty cycle control using the composite method in pulse voltage driving, the reflectivity designated by the reflectivity instruction value is substantially achieved with regard to the mirror optical element 22 irrespective of temperature change in the entire guaranteed operating temperature range.

A control system configuration of the electronic inner mirror 10 will be described with reference to FIG. 1. In this embodiment, a case where the composite method in pulse voltage driving is used will be described. In other words, based on the characteristics in FIGS. 8A, 8B and 10, the duty cycle of the driving pulse voltage for the mirror optical element 22 is controlled with 25 degrees centigrade set as the reference temperature. In this embodiment, the control switching temperature is set to be equal to the reference temperature. A rear camera 86 is a color video camera installed at a center position in the right-left direction of an outer rear portion of the vehicle with an optical axis horizontally set toward the vehicle rear side. An image of the vehicle rear side, the image being picked up by the rear camera 86 in the monitor mode, is subjected to necessary signal processing by a drawing circuit 88 and then supplied to the monitor display device 20 and displayed on the monitor display device 20 in real time. Here, the temperature sensor 30 is formed of a thermistor. A temperature detection circuit 90 converts a resistance value of the temperature sensor 30 into a voltage of a value corresponding to the resistance value (that is, a value corresponding to a detected temperature). The microcomputer 92 performs switching control of the operation mode (automatic antiglare/manual antiglare/antiglare off) based on an arbitrary operation mode switching operation by the driver. In other words, the microcomputer 92 (control circuit) receives various signals and performs, e.g., on/off control and luminance control of the monitor display device 20 and duty cycle control of the driving pulse voltage for the mirror optical element 22. An output voltage of the temperature detection circuit 90 is input to an analog port of the microcomputer 92 and subjected to A/D conversion. In the monitor mode, a signal resulting from the A/D conversion is used for temperature control of the monitor display device 20 and display quality-related temperature compensation control. Also, in the antiglare mode of the mirror mode, the signal resulting from the A/D conversion is used for temperature compensation control for the reflectivity of the mirror optical element 22. An ambient light sensor 94 detects an amount of light around the vehicle. A rear light sensor 96 detects an amount of light behind the vehicle. The ambient light sensor 94 and the rear light sensor 96 are mounted, for example, in the housing 12 (FIG. 2) of the electronic inner mirror 10. In other words, the ambient light sensor 94 is mounted in the housing 12 so as to face toward the vehicle front side and the rear light sensor 96 is mounted in the housing 12 so as to face toward the vehicle rear side. Based on the detected ambient light amount and the detected rear light amount, a signal processing circuit 98 performs antiglare necessity determination processing and processing for outputting reflectivity instruction value information if it is determined in the processing that "antiglare is necessary". In other words, if the ambient light amount is equal to or exceeds a predetermined value (if it can be regarded as daytime), antiglare is unnecessary, and thus, the signal processing circuit 98 outputs a signal of determination that "antiglare is unnecessary", irrespective of whether the rear light amount is large or small. If the ambient light amount is smaller than the predetermined value (it can be regarded as night-time), the determination changes according to the rear light amount. In other words, if the rear light amount is smaller than a predetermined value, antiglare is unnecessary, and thus, the signal processing circuit 98 outputs a signal of determination that "antiglare is unnecessary". If the rear light amount is equal to or exceeds the predetermined value (for example, if intense light of headlamps of a vehicle behind the relevant vehicle is received), antiglare is necessary, and thus, the signal processing circuit 98 outputs a signal of determination that "antiglare is necessary". Furthermore, if it is determined that "antiglare is necessary", based on the detected ambient light amount and the detected rear light amount, the signal processing circuit 98 obtains information indicating an instruction value of a reflectivity enabling achievement of a proper antiglare state (adjustment target reflectivity value) (reflectivity instruction value information) according to a combination of these light amounts via a predetermined arithmetic operation or with reference to a table provided in advance and outputs the information. The proper antiglare state according to a combination of these light amounts is a state in which if the ambient light amount is constant, as the rear light amount is larger, the reflectivity is lowered more by raising the duty cycle of the driving pulse voltage for the mirror optical element 22 more, and if the rear light amount is constant, as the ambient light amount is smaller, the reflectivity is lowered more by raising the duty cycle more. Consequently, an antiglare state in which excessive hindrance of viewability of a rear-side image is prevented and glare of reflected light can be reduced can be provided to the driver. The antiglare necessity determination signal is input to the microcomputer 92, and in the automatic antiglare mode of the mirror mode, is used for control of automatic switching between a non-antiglare state (state in which the duty cycle of the pulse voltage is fixed at 0%) and an antiglare state (state in which the duty cycle of the pulse voltage changes in a range from 0% to 50% (or a range that is narrower than the range)). Also, the reflectivity instruction value information is input to the microcomputer 92, and in the automatic antiglare mode of the mirror mode, is used as information of a reflectivity instruction value for control for changing the reflectivity.

A duty cycle characteristic memory 100 stores duty cycle-reflectivity characteristics at respective unit temperatures in the form of a table with regard to a temperature range of no less than 25 degrees centigrade in the entire guaranteed operating temperature range (for example, from −30 to 80 degrees centigrade). The duty cycle characteristic memory 100 stores no duty cycle-reflectivity characteristics with regard to a temperature range less than 25 degrees centigrade. Consequently, in the antiglare mode (the automatic antiglare mode or the manual antiglare mode), a reflectivity of the mirror optical element 22, the reflectivity being designated by reflectivity instruction value information, can be achieved with regard to the temperature range of no less than 25 degrees centigrade irrespective of the temperature of the mirror optical element 22. Note that in this embodiment, the duty cycle-reflectivity characteristic at 25 degrees centigrade is used as the reference characteristic for the duty cycle-reflectivity characteristic.

A duty cycle correction amount characteristic memory 101 stores (that is, stores, in the form of a table or an arithmetic expression) the temperature-duty cycle correction amount characteristic relative to the duty cycle-reflectivity characteristic at the reference temperature (25 degrees centigrade) (that is, the duty cycle correction amount at the reference temperature set to 0%) with regard to the temperature range less than 25 degrees centigrade in the entire guaranteed operating temperature range. The duty cycle correction amount characteristic memory 101 stores no temperature-duty cycle correction amount characteristic with regard to the temperature range of no less than 25 degrees centigrade.

The reflectivity control of the mirror optical element 22 by the microcomputer 92 in the antiglare mode will be described.

(Control for Output of Reflectivity Instruction Value)

In the automatic antiglare mode: a reflectivity instruction value according to a combination of the ambient light amount and the rear light amount is output from the signal processing circuit 98.

In the manual antiglare mode: a reflectivity instruction value according to a change operation (e.g., a manual operation or a voice operation) is input.

(Reflectivity Control)

If the temperature detected by the temperature sensor 30 is equal to or exceeds the reference temperature (25 degrees centigrade): the following is performed as first temperature compensation control. According to the temperature detected by the temperature sensor 30, information of a duty cycle according to the reflectivity instruction value is read in real time from the duty cycle-reflectivity characteristic at the relevant temperature, which is stored in the duty cycle characteristic memory 100. The duty cycle of the pulse voltage applied to the mirror optical element 22 is set in real time to the duty cycle according to the read information. The mirror optical element 22 is driven by the pulse voltage. As a result, the reflectivity of the mirror optical element 22 is controlled to the instruction value irrespective of temperature change.

If the temperature detected by the temperature sensor 30 is lower than the reference temperature: the following is performed as second temperature compensation control. Information of a duty cycle according to the reflectivity instruction value is read from the duty cycle-reflectivity characteristic at the reference temperature (25 degrees centigrade), which is stored in the duty cycle characteristic memory 100. Concurrently, information of a duty cycle correction amount according to the temperature detected by the temperature sensor 30 is read or calculated from the temperature-duty cycle correction amount characteristic stored in the duty cycle correction amount characteristic memory 101. Information of a corrected duty cycle obtained by shifting (increasing/decreasing) the information of the duty cycle read from the duty cycle characteristic memory 100 by the information of the duty cycle correction amount read or calculated from the temperature-duty cycle correction amount characteristic stored in the duty cycle correction amount characteristic memory 101 is obtained. The duty cycle of the pulse voltage applied to the mirror optical element 22 is set to a duty cycle according to the information of the corrected duty cycle. The mirror optical element 22 is driven by the pulse voltage. As a result, the reflectivity of the mirror optical element 22 is controlled to the instruction value irrespective of temperature change.

A display quality-related temperature compensation characteristic memory 102 stores (that is, stores, in the form of a table or an arithmetic expression) a characteristic for obtaining predetermined display quality (that is, a chromaticity or the like) in the monitor mode irrespective of the temperature of the monitor display device 20. This characteristic is a characteristic for adjusting a driving voltage for the color liquid-crystal panel according to a display signal (that is, a level of a driving signal according to a display signal) according to the temperature. In the monitor mode, based on a temperature detection signal obtained from the temperature detection circuit 90, a relevant adjustment amount is read or calculated by the microcomputer 92 from characteristic stored in the display quality-related temperature compensation characteristic memory 102. In addition, e.g., an operation mode switching signal, an antiglare mode switching signal and a light turn-on signal are input to the microcomputer 92. The operation mode switching signal is a signal for switching between the monitor mode and the mirror mode and is a signal according to an operation mode switching operation by the driver. The antiglare mode switching signal is a signal for switching operation modes to any of the automatic antiglare mode, the manual antiglare mode and the antiglare-off mode and is a signal according to an antiglare mode switching operation by the driver. The light turn-on signal is a signal indicating that clearance lamps or headlamps are on. A monitor display control section 104 performs the on/off control and the luminance control (that is, temperature control) of the monitor display device 20 and display quality-related temperature compensation control based on control signals for the monitor display device 20, which are output from the microcomputer 92. A mirror optical element driving circuit 106 performs duty cycle control of the driving pulse voltage for the mirror optical element 22 based on a control signal for the mirror optical element 22, which is output from the microcomputer 92. Note that the duty cycle characteristic memory 100, the duty cycle correction amount characteristic memory 101 and the display quality-related temperature compensation characteristic memory 102 can be provided within a same memory element.

A backlight driving circuit 105 performs on/off control of the backlight 26 (FIG. 2) of the monitor display device 20 and luminance control during the backlight 26 being on, by means of PWM control of a driving current for the backlight 26 (here, the white light-emitting diodes). In other words, in the mirror mode, a duty cycle of the driving current is set at 0% to turn the backlight 26 off. In the monitor mode, the duty cycle of the driving current is raised to be equal to or exceed a predetermined value to turn the backlight 26 on. Also, in the monitor mode, according to switching between night-time and daytime and the temperature detected by the temperature sensor 30, switching of the duty cycle of the driving current is performed. In other words, at night-time, the duty cycle is lowered to reduce glare of a monitor image, and at daytime, the duty cycle is raised to enhance viewability of a monitor image. Here, switching between night-time and daytime is performed based on whether or not the lamps (the clearance lamps and the headlamps) are on. Also, if the temperature detected by the temperature sensor 30 exceeds a predetermined value, the duty cycle is lowered to, for example, a duty cycle for night-time to curb a further temperature increase.

Figure 11:
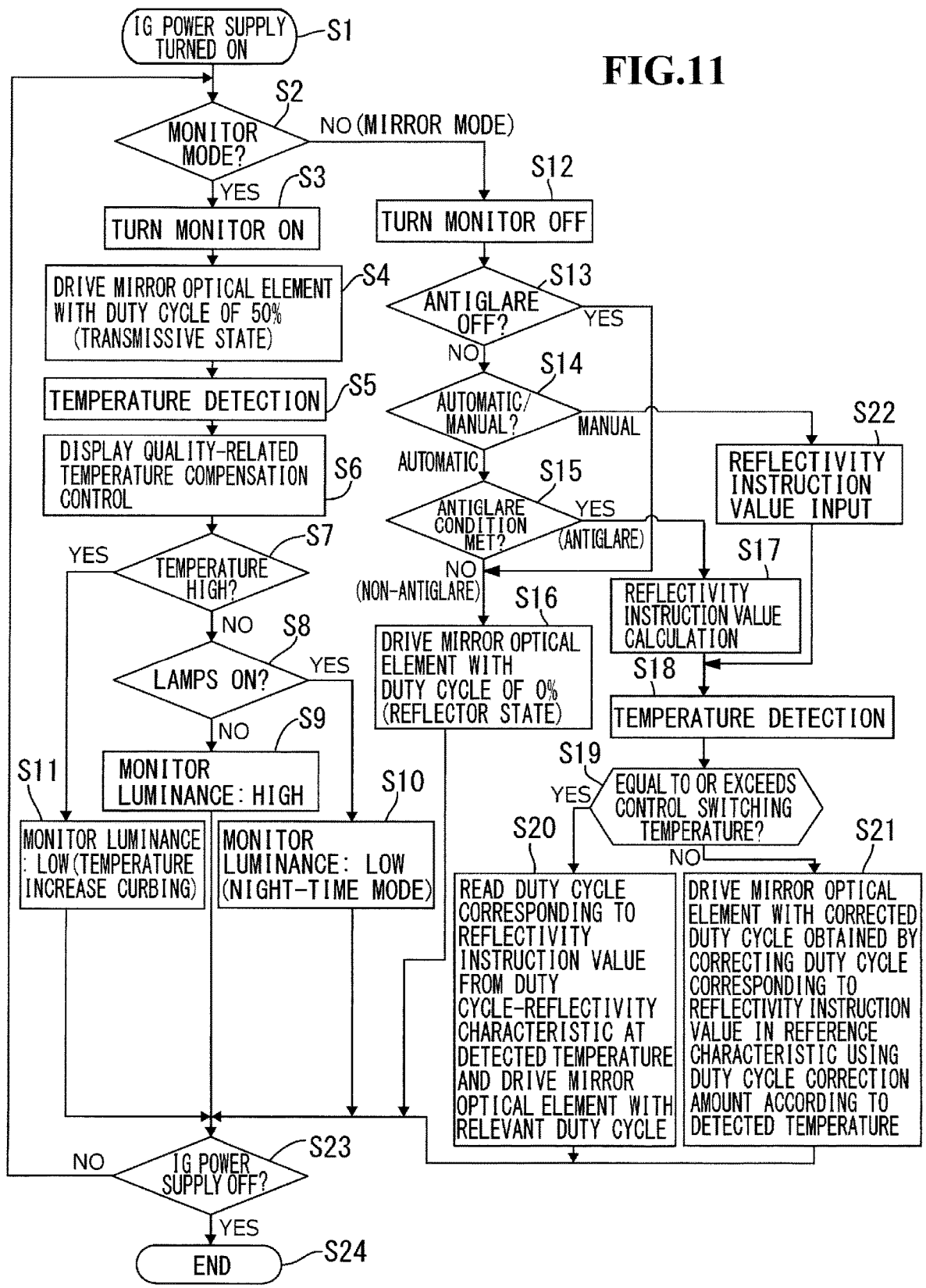
FIG. 11 is a flowchart indicating the content of control by the microcomputer (that is, the control circuit) in FIG. 1.

The contents of control of the electronic inner mirror 10 during respective operations by the microcomputer 92 in the control system configuration in FIG. 1 will be described with reference to FIG. 11. Upon an ignition power supply of the vehicle being turned on (S1), a currently set operation mode is determined (S2). As a result of the determination, if the monitor mode is set ("YES" in S2), the monitor display device 20 is turned on (the backlight 26 is turned on) (S3). Also, the mirror optical element 22 is driven with the duty cycle fixed at 50% to enter a transmissive state (S4). At this time, since the mirror optical element 22 only needs to be driven with the duty cycle fixed at 50%, temperature compensation control for the reflectivity is unnecessary and is not performed with regard to the mirror optical element 22. An image of an area behind the vehicle, the image being picked up by the rear camera 86, is displayed on the monitor display device 20, and the image penetrates the mirror optical element 22 and reaches the viewpoint 18 of the driver. Consequently, the driver can drive the vehicle while checking the image. In the monitor mode, temperature detection by the temperature sensor 30 is repeatedly performed (S5). Then, known display quality-related temperature compensation control is performed according to the detected temperature (S6). Examples of this temperature compensation control include, e.g., transmissivity correction control by adjusting a level of the driving signal for the monitor display device 20, the driving signal corresponding to a display signal, and chromaticity correction control described in Japanese Patent Laid-Open No. 2000-267629. Furthermore, if the detected temperature is equal to or below a temperature that is a criterion for determining that the monitor display device 20 is in an overheated state ("NO" in S7) and the lamps (the clearance lamps and the headlamps) are off ("NO" in S8), the luminance of the backlight 26 is set to "high" (S9). On the other hand, if the detected temperature is equal to or below the temperature that is the criterion for determining that the monitor display device 20 is in an overheated state ("NO" in S7) and the lamps (the clearance lamps or the headlamps) are on ("YES" in S8), the luminance of the backlight 26 is set to "low" (night-time mode) (S10) to reduce glare of monitor display. Also, if the detected temperature exceeds the temperature that is the criterion for determining that the monitor display device 20 is in an overheated state ("YES" in S7), the luminance of the backlight 26 is set to "low" (luminance that is the same as or different from that in the night-time mode) (S11) to curb a further temperature increase. Note that with regard to steps S8 to S10, instead of monitor luminance control according to whether or not the lamps are on, control in which the monitor luminance is changed in a stepwise manner or continuously according to an ambient light amount detected by an ambient light sensor (for example, the ambient light sensor 94 in FIG. 1) (as the ambient light amount is larger, the luminance is made to be higher).

If the operation mode is switched to the mirror mode via a mode switching operation by the driver ("NO" in S2), the monitor display device 20 is turned off (backlight 26 is turned off) (S12). Then, whether or not an antiglare condition (condition for providing the antiglare state) is met is determined (S13).

In other words, a state meeting any of (a), (b) and (c) below should be the "non-antiglare" state:
(a) The antiglare-off mode is set;
(b) The automatic antiglare mode is set and the ambient light amount is equal to or exceeds a predetermined value; and
(c) The automatic antiglare mode is set, the ambient light amount is smaller than a predetermined value and the rear light amount is smaller than a predetermined value.

On the other hand, a state meeting either of (d) and (e) below should be the "antiglare" state:
(d) The manual antiglare mode is set; and
(e) The automatic antiglare mode is set, the ambient light amount is smaller than a predetermined value and the rear light amount is equal to or exceeds a predetermined value.

Therefore, if the antiglare-off mode is set ("YES" in S13, which corresponds to (a) above), the mirror optical element 22 is driven with the duty cycle fixed at 0% (S16). At this time, since the mirror optical element 22 only needs to be driven with the duty cycle fixed at 0%, the temperature compensation control for the reflectivity is unnecessary and is not performed with regard to the mirror optical element 22.

On the other hand, where the automatic antiglare mode is set ("NO" in S13 and "automatic" in S14), if the relevant antiglare condition is met ("YES" in S15, which corresponds to (e) above), a reflectivity instruction value is automatically calculated based on the ambient light amount and the rear light amount (S17). At this time, the temperature is repeatedly detected by the temperature sensor 30 (S18). If the detected temperature is equal to or exceeds the control switching temperature ("YES" in S19), information of a duty cycle corresponding to the reflectivity instruction value is read in real time from the duty cycle-reflectivity characteristic at the detected temperature, which is stored in the duty cycle characteristic memory 100, to drive the mirror optical element 22 with the relevant duty cycle (S20). On the other hand, if the detected temperature is lower than the control switching temperature ("NO" in S19), information of a duty cycle corresponding to the reflectivity instruction value is read from the reference characteristic (duty cycle-reflectivity characteristic at 25 degrees centigrade) stored in the duty cycle characteristic memory 100. Also, a duty cycle correction amount according to the detected temperature is read or calculated in real time from the temperature-duty cycle correction amount characteristic stored in the duty cycle correction amount characteristic memory 101. Then, a corrected duty cycle obtained by correcting the read duty cycle using the read or calculated duty cycle correction amount is calculated in real time, and the mirror optical element 22 is driven with the corrected duty cycle (S21). The above control provides a reflectivity of the mirror optical element 22, the reflectivity substantially meeting the calculated reflectivity instruction value, in the automatic antiglare mode irrespective of temperature change.

Also, if the manual antiglare mode is set ("manual" in S14), a reflectivity instruction value designated via a change operation by the driver is input (S22). At this time, the temperature is repeatedly detected by the temperature sensor 30 (S18). If the detected temperature is equal to or exceeds the control switching temperature ("YES" in S19), information of a duty cycle corresponding to the reflectivity instruction value is read in real time from the duty cycle-reflectivity characteristic at the detected temperature, which is stored in the duty cycle characteristic memory 100. Then, the mirror optical element 22 is driven with the relevant duty cycle (S20). On the other hand, if the detected temperature is lower than the control switching temperature ("NO" in S19), information of a duty cycle corresponding to the reflectivity instruction value is read from the reference characteristic stored in the duty cycle characteristic memory 100. Also, a duty cycle correction amount according to the detected temperature is read or calculated in real time from the temperature-duty cycle correction amount characteristic stored in the duty cycle correction amount characteristic memory 101. Then, a corrected duty cycle obtained by correcting the read duty cycle using the read or calculated duty cycle correction amount is calculated in real time and the mirror optical element 22 is driven with the corrected duty cycle (S21). The above control provides a reflectivity of the mirror optical element 22, the reflectivity substantially meeting the designated reflectivity instruction value, in the manual antiglare mode irrespective of temperature change. Note that FIG. 11 indicates the content of control according to the composite method in pulse voltage driving. On the other hand, in the case of the table method in pulse voltage driving, instead of steps S19 to S21, according to the temperature of the mirror optical element 22, the temperature being detected in step S18, a duty cycle is read, the duty cycle corresponding to a reflectivity instruction value designated automatically or via a manual operation from the duty cycle-reflectivity characteristic at the relevant temperature. Then, the duty cycle of the driving pulse voltage for the mirror optical element 22 is controlled to the read value. Also, in the case of the shift method in pulse voltage driving, instead of steps S19 to S21, according to the temperature of the mirror optical element 22, the temperature being detected in step S18, a duty cycle correction amount is read or calculated from the temperature-duty cycle correction amount characteristic. Then, according to a characteristic obtained by shifting the reference characteristic in the duty cycle direction by the correction amount, the duty cycle is controlled, and thereby the reflectivity of the mirror optical element 22 is controlled.

The above control is continued during the ignition power supply of the vehicle being on ("NO" in S23). If the ignition power supply of the vehicle is turned off ("YES" in S23), the control ends (S24). In a state in which the ignition power supply of the vehicle is off, the monitor display device 20 is off and the mirror optical element 22 is in a state that is substantially the same as the antiglare-off mode, and thus, a rear view function by the physical mirror is ensured. Also, in case that the electronic inner mirror 10 fails and no power is supplied even though the ignition power supply of the vehicle is on, also, the monitor display device 20 is turned off, and the mirror optical element 22 enters a state that is substantially the same as the antiglare-off mode, and thus, the rear view function by the physical mirror is ensured.

Although in the above embodiment, the duty cycle in the antiglare mode is changed in a range from 0% to 50%, the duty cycle can be changed in a narrower range (for example, from 10% to 40%) within the range from 0% to 50%.

Although in the above embodiment, the mirror optical element is configured in such a manner that as the duty cycle of the applied pulse voltage is higher, the reflectivity is lower, conversely, the mirror optical element can be configured in such a manner that as the duty cycle of the applied pulse voltage is higher, the reflectivity is higher.

Although in the above embodiment, the amplitude of the PWM voltage is fixed, the amplitude can be variable (for example, can be varied in a plurality of steps such as two steps).

Although in the above embodiment, the duty cycle characteristic memory 100 stores the characteristic of the reflectivity of the mirror optical element 22 relative to the duty cycle of the pulse signal applied to the mirror optical element 22, instead, the duty cycle characteristic memory 100 can store a characteristic of the transmissivity relative to the duty cycle.

Although the above embodiment has been described in terms of a case where the duty cycle characteristic memory 100 stores the duty cycle-reflectivity characteristics in the form of a table, the duty cycle characteristic memory 100 can be configured to store the duty cycle-reflectivity characteristics in the form of an arithmetic expression.

Although in the above embodiment, as a temperature sensor, a variable resistance-type temperature sensor (that is, a thermistor) is used, this invention is not limited to this example. In other words, a semiconductor-type temperature sensor or any of various other temperature sensors can be used.

Although in the above embodiment, an installation position of the temperature sensor is the inner side of the frame body of the monitor display device, this invention is not limited to this example. In other words, the temperature sensor can be installed on the outer side of the frame body of the monitor display device or any of other places at which a temperature of the monitor display device can be detected.

Although in the above embodiment, the installation position of the temperature sensor is the upper edge of the frame body, this invention is not limited to this example, and the temperature sensor can be installed at, e.g., a side edge or a lower edge of the frame body. Installation of the temperature sensor close to the light source of the backlight that becomes hottest in the monitor display device enables curbing a part of the monitor display device locally entering an overheated state.

Although in the above embodiment, the mirror optical element is formed of a TN-type liquid-crystal panel with a reflection-type polarizer disposed on the back side thereof, the mirror optical element used in this invention is not limited to this example. In other words, any of other mirror optical elements in which a reflectivity and a transmissivity are changed in respective directions opposite to each other by electric driving can be used.

Although in the above embodiment, the luminance of the backlight is switched between two levels, high and low, according to the detected temperature of the monitor display device, this invention is not limited to this example. In other words, control for changing the luminance of the backlight in multiple steps or steplessly can be performed according to the detected temperature of the monitor display device. Also, the backlight can be configured in such a manner that the luminance of the backlight can be variably adjusted via an operation by a user.

Although in the above embodiment, the control circuit is formed of a microcomputer, this invention is not limited to this example and the control circuit can be formed by a combination of a plurality of circuit elements.

Although in the above embodiment, switching between the monitor mode and the mirror mode is performed with regard to the entire viewed surface of the inner mirror, this invention is not limited to this example. For example, like the inner mirror described in Japanese Patent No. 4348061, it is possible to dispose a monitor display device only at a partial area of a viewed surface and performs switching between a monitor mode and a mirror mode only with regard to the partial area.

Although in the above embodiment, the liquid-crystal of the monitor display device is IPS-type liquid-crystal, this invention is not limited to this example, and the liquid-crystal of the monitor display device may be FSS (fringe-field switching)-type liquid-crystal, VA (vertical alignment)-type liquid-crystal or TN-type liquid-crystal.

Although the embodiment has been described in terms of a case where this invention is applied to an inner mirror for a vehicle, this invention is not limited to this case and is applicable to mirror display apparatuses for various purposes, the mirror display apparatuses having a monitor mode and a mirror mode.

What is claimed is:

1. A mirror display apparatus comprising a monitor display device, a mirror optical element disposed on a front side of a display surface of the monitor display device, and a control circuit, wherein:
   the mirror optical element includes a liquid-crystal panel with a reflection-type polarizer disposed on a back side thereof,
   the mirror optical element is an element having a reflectivity and a transmissivity that are changed in respective directions opposite to each other via electric driving using a voltage applied to the liquid-crystal panel so that the element can be changed into a transmissive state in which the reflectivity is low and the transmissivity is high, relatively, a reflector state in which the reflectivity is high and the transmissivity is low, relatively, and a reflectivity-reduced reflector state between these states, in a stepwise manner or steplessly, and reversibly,
   the control circuit is configured to be capable of performing operation mode switching control to set an operation mode of the mirror display apparatus by performing switching between a monitor mode and a mirror mode,
   the monitor mode is an operation mode including at least an operating state in which the monitor display device is set in a display state and the mirror optical element is set in the transmissive state,
   the mirror mode is an operation mode including at least an operating state in which the monitor display device is set in a non-display state and the mirror optical element is set in the reflector state or the reflectivity-reduced reflector state, and
   the control circuit is configured to be capable of performing reflectivity and transmissivity change control to use a pulse voltage as the voltage applied to the liquid-crystal panel and change a duty cycle of the pulse voltage to change the reflectivity and the transmissivity of the mirror optical element,
   wherein the mirror display apparatus includes a temperature sensor; and
   the control circuit is configured to be capable of, in the mirror mode in which the mirror optical element is set in the reflectivity-reduced reflector state, performing temperature compensation control to adjust the duty cycle of the pulse voltage applied to the liquid-crystal panel according to a temperature detected by the temperature sensor to curb fluctuation in reflectivity of the mirror display apparatus due to temperature, and
   wherein the mirror display apparatus further comprising:
   a duty cycle characteristic memory that with regard to a duty cycle-reflectivity or transmissivity characteristic that is a characteristic of the reflectivity or the transmissivity of the mirror optical element relative to the duty cycle of the pulse voltage, stores a plurality of the duty cycle-reflectivity or transmissivity characteristics according to temperatures; and a duty cycle correction amount characteristic memory that stores a temperature-duty cycle correction amount characteristic for, relative to a reference characteristic of the duty cycle-reflectivity or transmissivity characteristics, the reference characteristic being the duty cycle-reflectivity or transmissivity characteristic at a predetermined reference temperature, correcting an amount of shift of the duty cycle in the reference characteristic due to a temperature change, the temperature-duty cycle correction amount characteristic being a characteristic of a correction amount for the duty cycle relative to a temperature, wherein the control circuit is configured to be capable of, if the temperature detected by the temperature sensor is in a predetermined first temperature range, performing first temperature compensation control to, according to the temperature detected by the temperature sensor, adjust the duty cycle of the pulse voltage based on the duty cycle-reflectivity or transmissivity characteristic at the relevant temperature, and if the temperature detected by the temperature sensor is in a predetermined second temperature range that is lower than the first temperature range, performing second temperature compensation control to obtain a correction amount for the duty cycle from the temperature-duty cycle correction amount characteristic according to the temperature detected by the temperature sensor and adjust the duty cycle of the pulse voltage based on a characteristic obtained by shifting the duty cycle in the reference characteristic by the obtained correction amount, as the temperature compensation control.

2. The mirror display apparatus according to claim 1, wherein the control circuit is configured to be capable of, if the temperature detected by the temperature sensor is equal to or exceeds a predetermined control switching temperature, performing the first temperature compensation control, and if the temperature detected by the temperature sensor is lower than the control switching temperature, performing the second temperature compensation control.

3. The mirror display apparatus according to claim 2, wherein the control switching temperature is set to be equal to the reference temperature.

4. The mirror display apparatus according to claim 1, wherein the duty cycle characteristic memory stores the duty cycle-reflectivity or transmissivity characteristic with regard to a temperature in the first temperature range and does not store the duty cycle-reflectivity or transmissivity characteristic with regard to a temperature in the second temperature range.

5. The mirror display apparatus according to claim 1, wherein the control circuit is configured to be capable of performing the second temperature compensation control only for a temperature range in which the duty cycle-reflectivity or transmissivity characteristics can be regarded as characteristics with the respective duty cycles shifted from each other.

6. The mirror display apparatus according to claim 1, wherein the control circuit is configured to be capable of, in the mirror mode in which the mirror optical element is set in the reflector state, performing control to set the duty cycle of the pulse voltage applied to the liquid-crystal panel to a fixed duty cycle that enables the mirror optical element to be maintained in the reflector state irrespective of the temperature detected by the temperature sensor.

7. The mirror display apparatus according to claim 1, wherein the control circuit is configured to be capable of, in the monitor mode in which the mirror optical element is set in the transmissive state, performing control to set the duty cycle of the pulse voltage applied to the liquid-crystal panel to a fixed duty cycle that enables the mirror optical element to be maintained in the transmissive state irrespective of the temperature detected by the temperature sensor.

8. The mirror display apparatus according to claim 1, wherein the control circuit is configured to be capable of in the monitor mode, performing temperature control of the monitor display device by adjusting a luminance of the monitor display device based on the temperature detected by the temperature sensor or is configured to be capable of performing display quality-related temperature compensation control of the monitor display device by adjusting a driving state of the monitor display device according to a display signal based on the temperature detected by the temperature sensor, or is configured to be capable of performing both the temperature control and the display quality-related temperature compensation control, such that the temperature sensor is shared between the temperature compensation control and the temperature control or between the temperature compensation control and the display quality-related temperature compensation control or between the temperature compensation control and the temperature control and the display quality-related temperature compensation control.

* * * * *